United States Patent
Kim et al.

(10) Patent No.: US 12,089,208 B2
(45) Date of Patent: Sep. 10, 2024

(54) METHOD FOR SETTING BANDWIDTH PART AND TRANSMITTING AND RECEIVING DATA IN WIRELESS COMMUNICATION SYSTEM, AND DEVICE FOR SAME

(71) Applicant: LG ELECTRONICS INC., Seoul (KR)

(72) Inventors: Hyungtae Kim, Seoul (KR); Jiwon Kang, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 481 days.

(21) Appl. No.: 17/422,269

(22) PCT Filed: Jan. 13, 2020

(86) PCT No.: PCT/KR2020/000624
§ 371 (c)(1),
(2) Date: Jul. 12, 2021

(87) PCT Pub. No.: WO2020/145797
PCT Pub. Date: Jul. 16, 2020

(65) Prior Publication Data
US 2022/0095338 A1    Mar. 24, 2022

(30) Foreign Application Priority Data

Jan. 11, 2019 (KR) .......................... 10-2019-0004207

(51) Int. Cl.
*H04W 72/1273* (2023.01)
*H04W 72/23* (2023.01)

(52) U.S. Cl.
CPC ....... *H04W 72/1273* (2013.01); *H04W 72/23* (2023.01)

(58) Field of Classification Search
None
See application file for complete search history.

(56) References Cited

U.S. PATENT DOCUMENTS

| | | | |
|---|---|---|---|
| 2013/0215835 A1* | 8/2013 | Chen ................... | H04W 72/20 370/328 |
| 2020/0169956 A1* | 5/2020 | Sun ...................... | H04W 24/08 |

(Continued)

FOREIGN PATENT DOCUMENTS

KR    10-2018-0080700    7/2018

OTHER PUBLICATIONS

CATT, "Offline Discussion on UE Power Saving Schemes," R1-1814327, Presented at 3GPP TSG RAN WG1 Meeting #95, Spokane, U.S.A., Nov. 12-16, 2018, 5 pages.

(Continued)

*Primary Examiner* — Adnan Baig
(74) *Attorney, Agent, or Firm* — Fish & Richardson P.C.

(57) ABSTRACT

A method for a terminal to receive data includes: a bandwidth part setting related step; a step for receiving control resource-related setting information about a physical control channel on the basis of the set BWP; a step for setting each of one or more control resources included in the setting information to a first control resource group or a second control resource group, and receiving a first physical control channel and a second physical control channel on the basis of the setting information; a step for receiving a first physical data channel on the basis of the first control resource group associated with the control resource in which the first physical control channel has been received; and a step for receiving a second physical data channel on the basis of the second control resource group associated with the control resource in which the second physical control channel has been received.

7 Claims, 11 Drawing Sheets

(56) References Cited

U.S. PATENT DOCUMENTS

| | | | | |
|---|---|---|---|---|
| 2020/0252180 A1* | 8/2020 | Takeda | .................. | H04W 72/12 |
| 2020/0260454 A1* | 8/2020 | Dou | ...................... | H04L 5/0044 |
| 2021/0153185 A1* | 5/2021 | Schober | ................ | H04L 5/0051 |
| 2021/0410170 A1* | 12/2021 | Matsumura | ........... | H04L 5/0044 |

OTHER PUBLICATIONS

ETSI, "5G; NR; Physical layer procedures for data (3GPP TS 38.214 version 15.3.0 Release 15)" 2018, 99 pages.

LG Electronics, "Summary #2 on frame structure for NR-U," R1-1814000, Presented at 3GPP TSG RAN WG1 Meeting #95, Spokane, USA, Nov. 12-16, 2018, 19 pages.

NTT Docomo, Inc., "On search space configuration for cross-carrier scheduling," R1-1814117, Presented at 3GPP TSG RAN WG1 Meeting 95, Spokane, USA, Nov. 12-16, 2018 Agenda item: 7.1.3.1, 15 pages.

PCT International Search Report in International Appln. No. PCT/KR2020/000624, dated Apr. 28, 2020, 5 pages.

* cited by examiner

[Fig. 1]
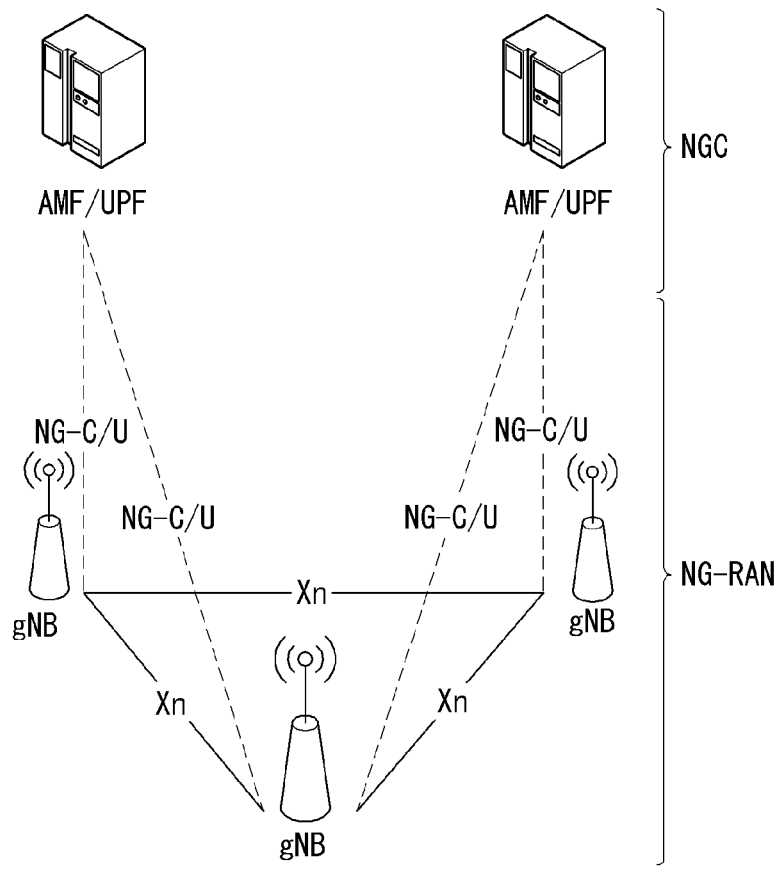
[Fig. 2]
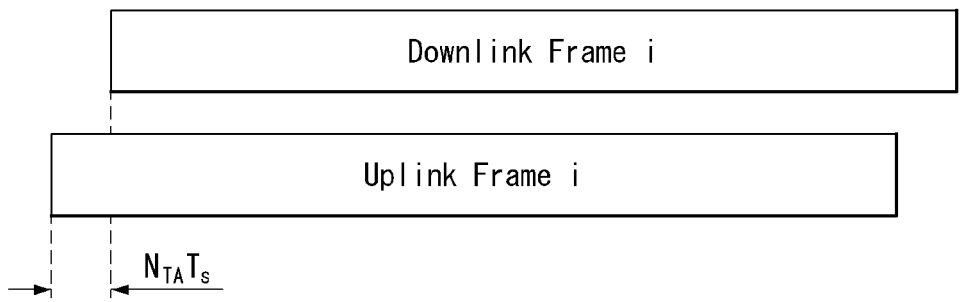

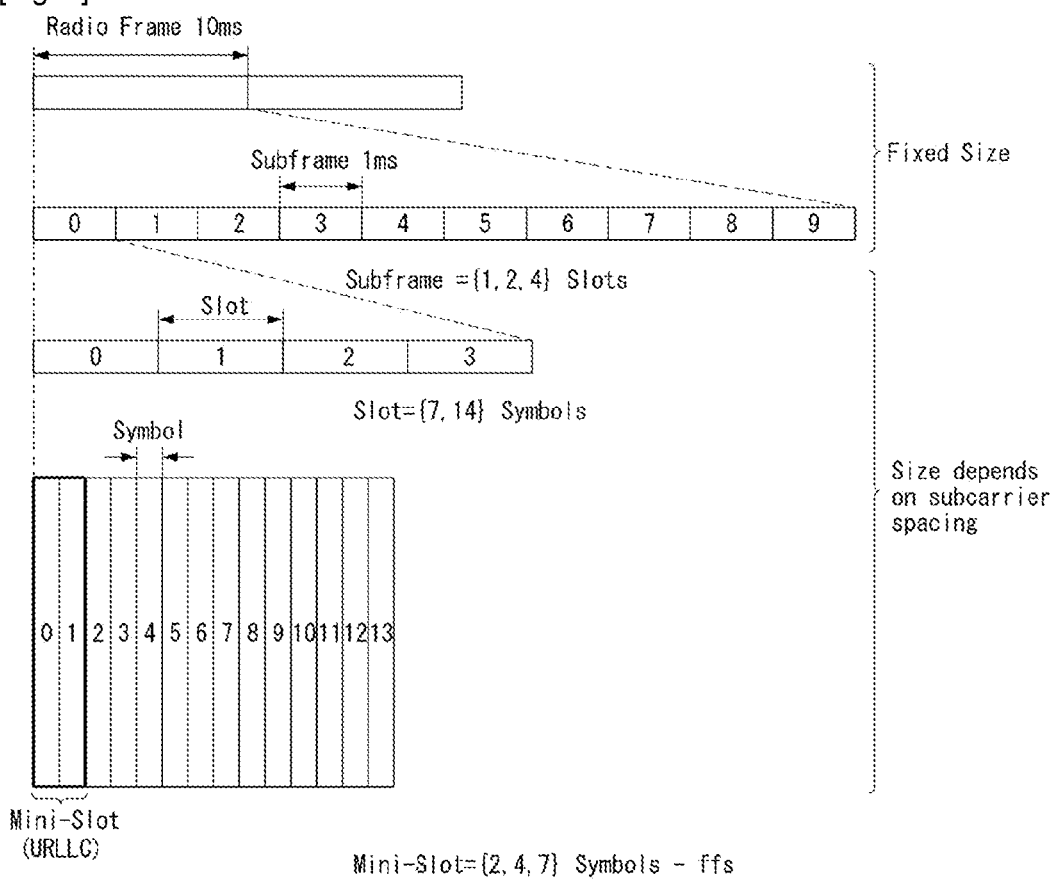

[Fig. 4]
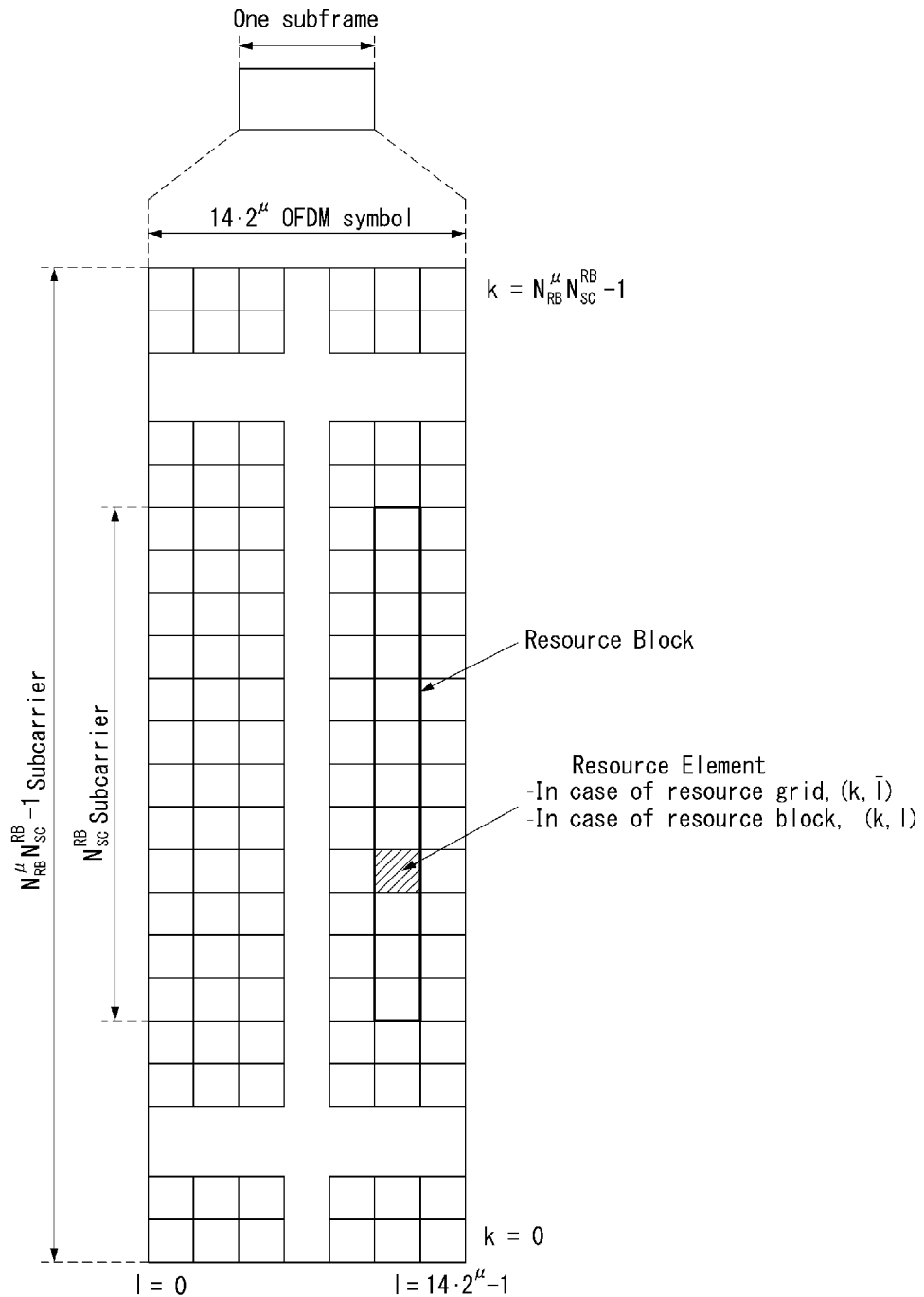

[Fig. 5]
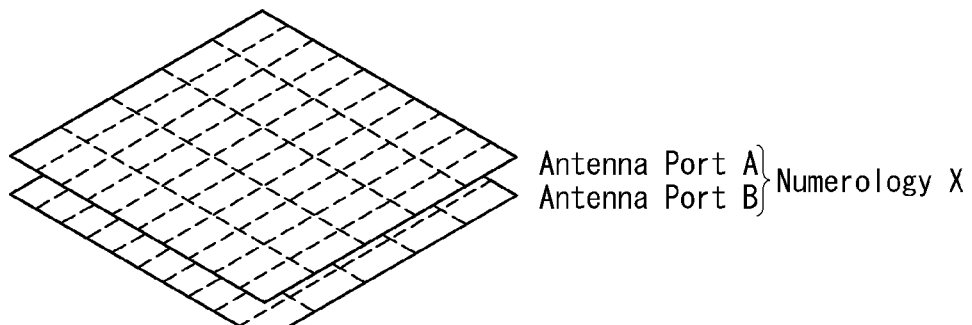
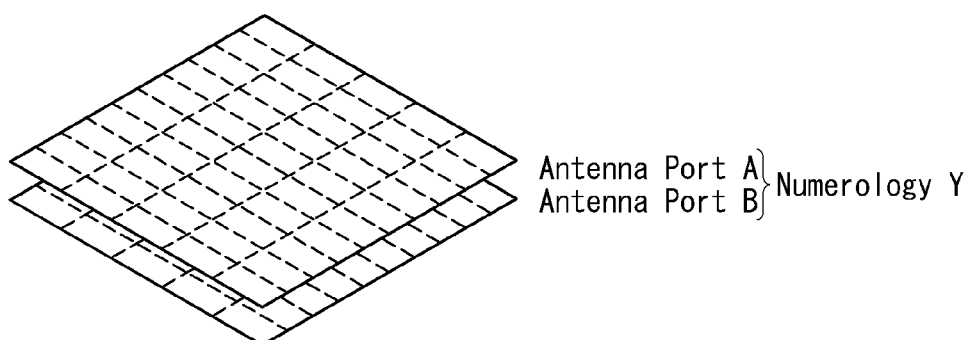
[Fig. 6]
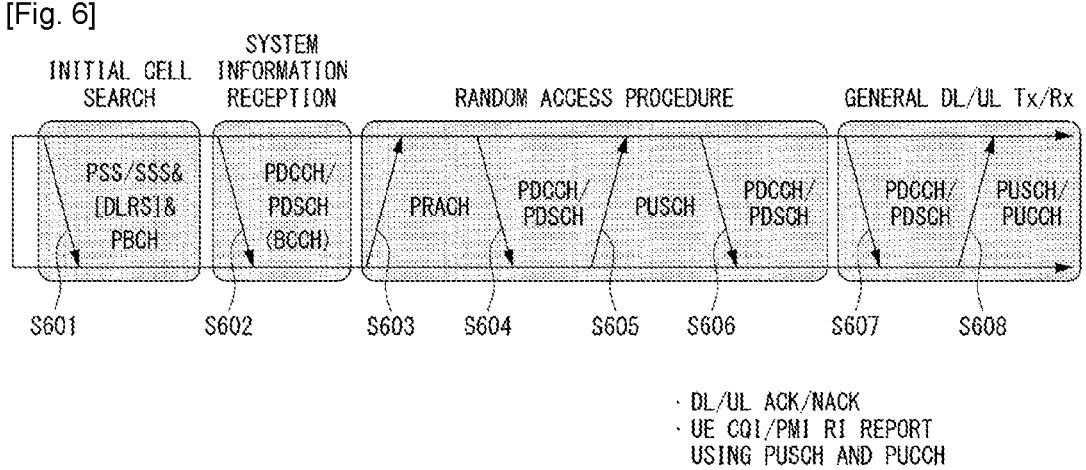

[Fig. 7]
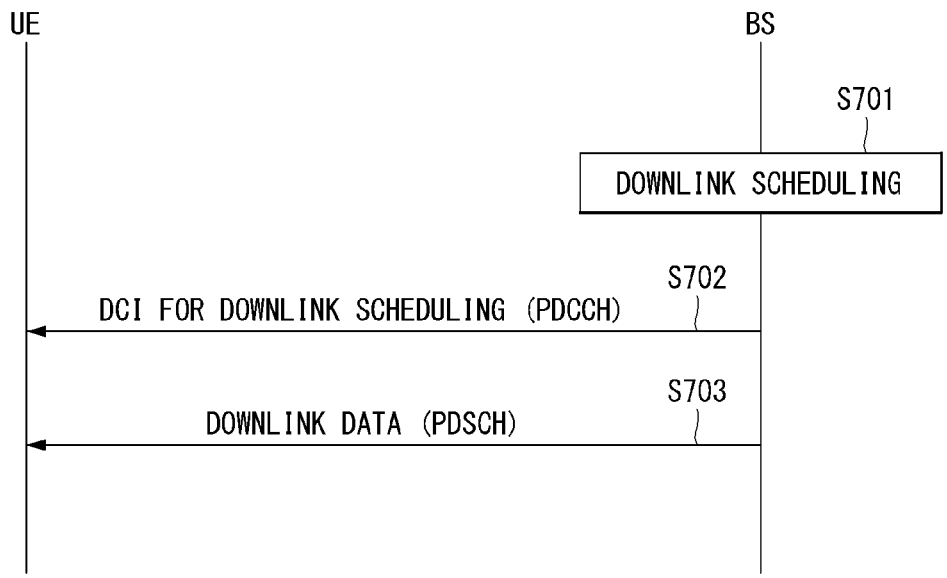
[Fig. 8]
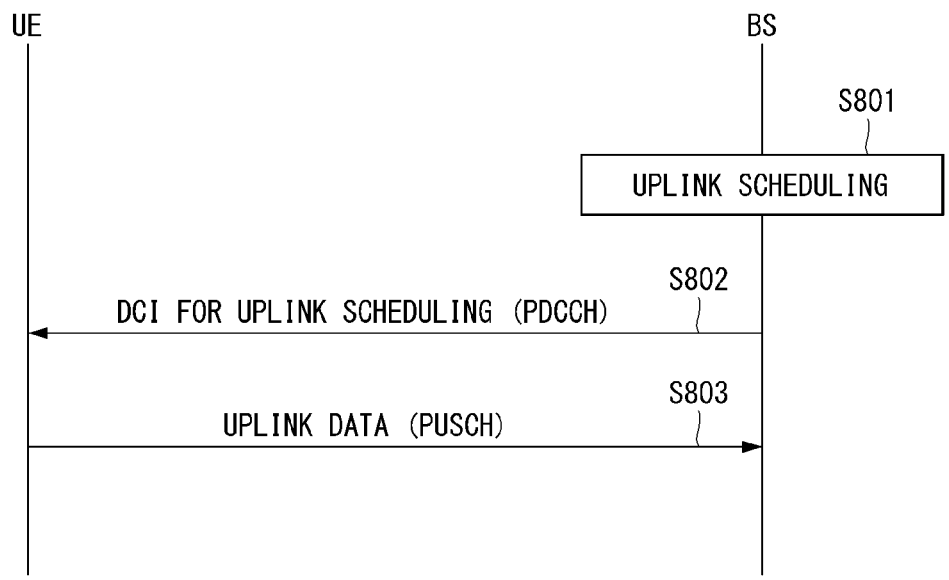

[Fig. 9]
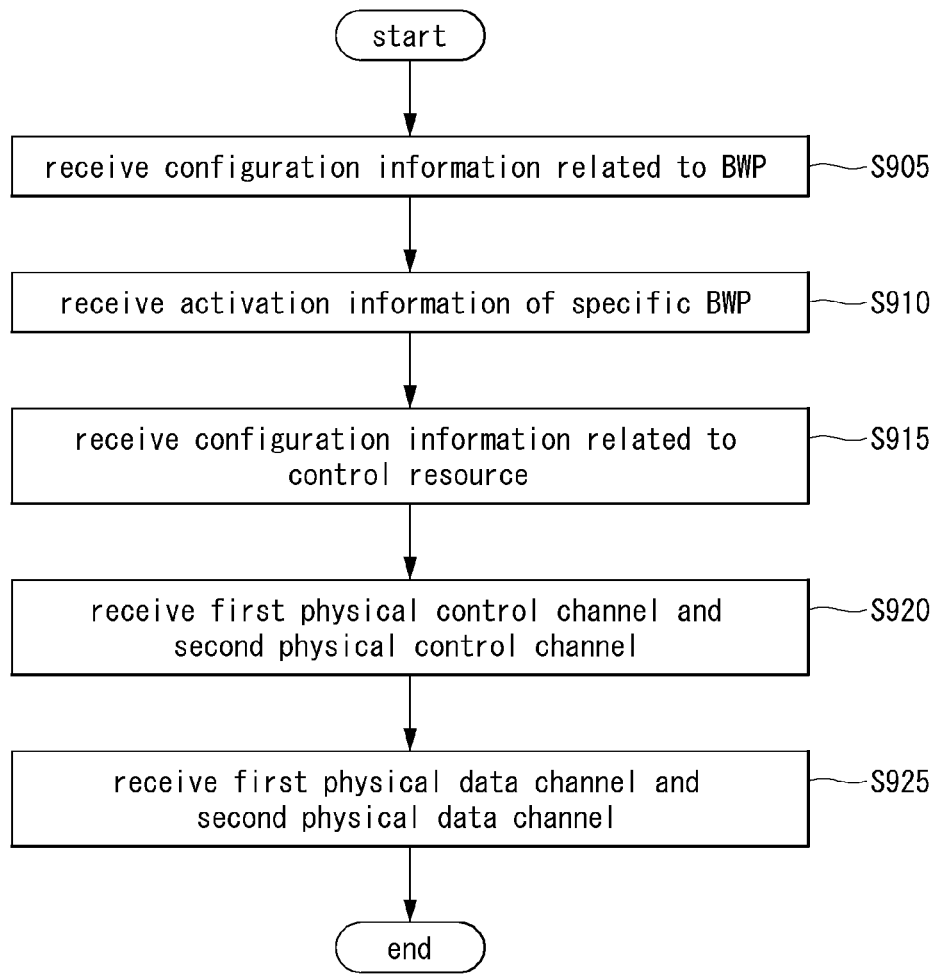

[Fig. 10]
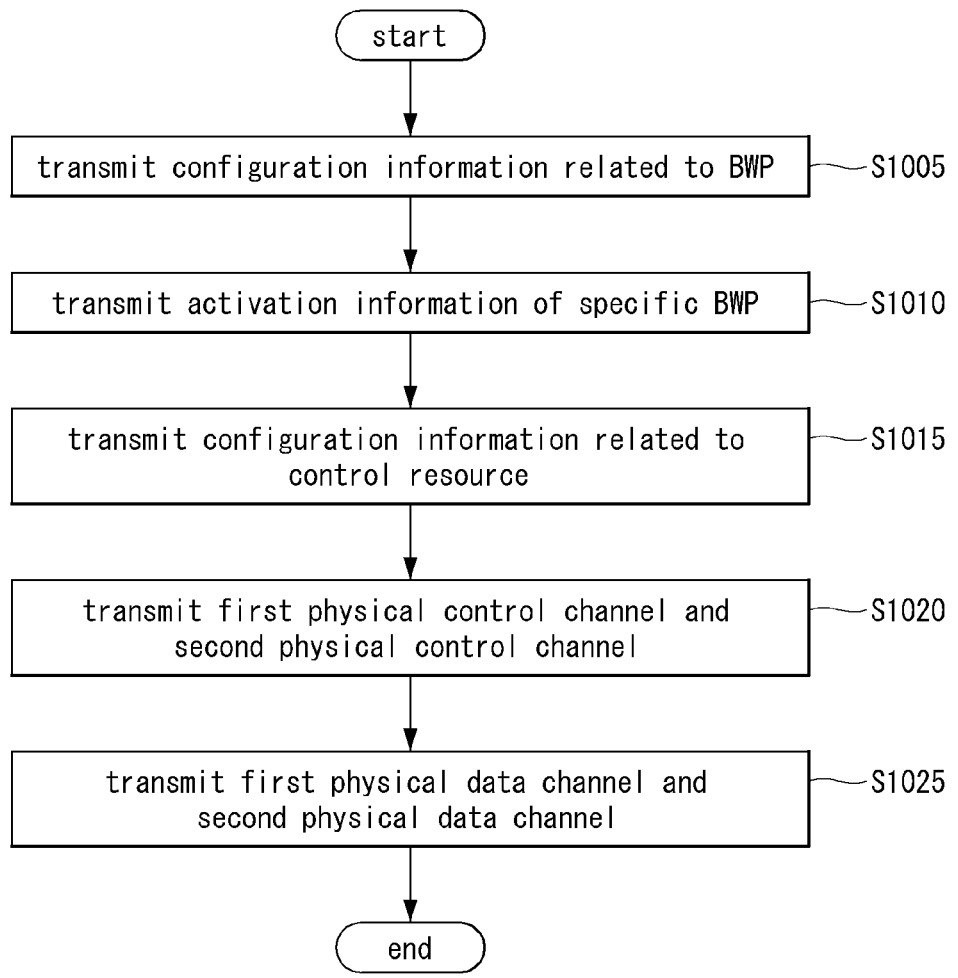

[Fig. 11]
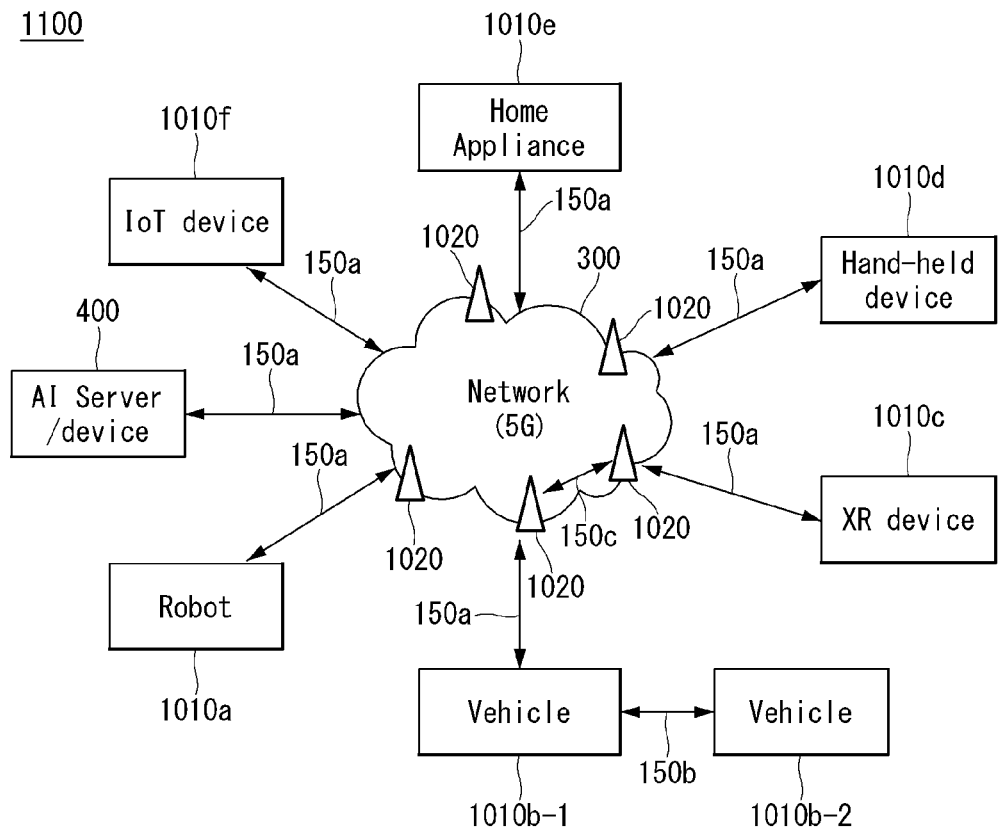
[Fig. 12]
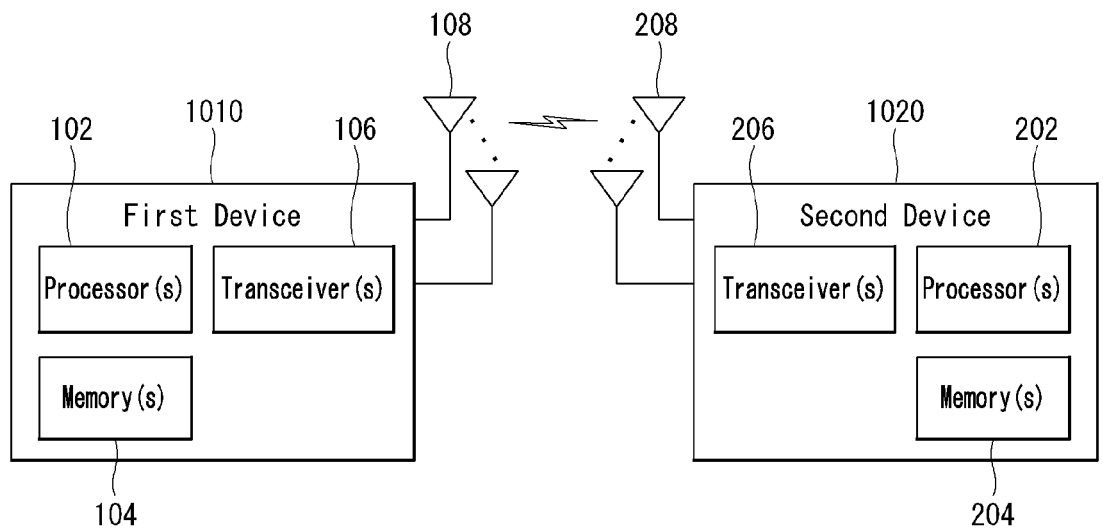

[Fig. 13]
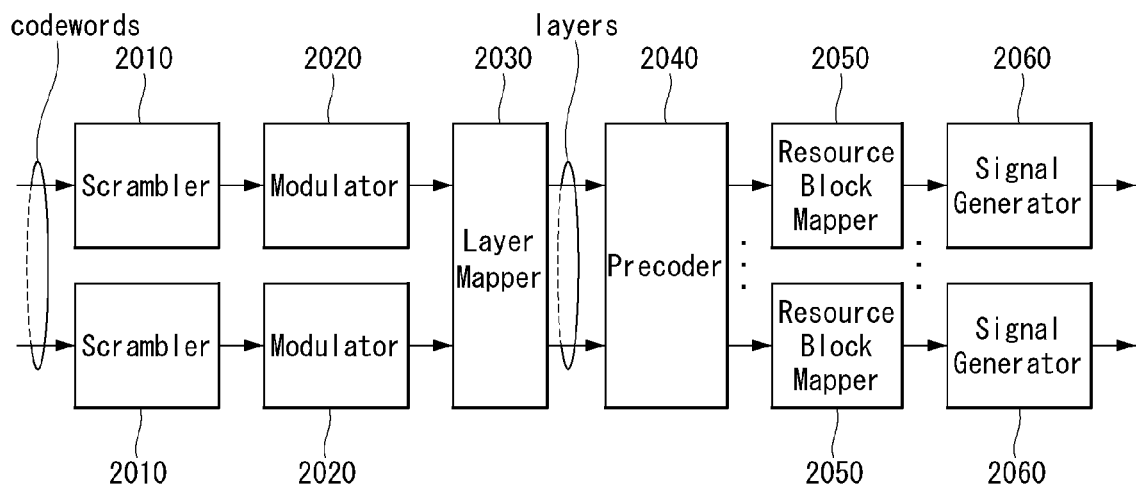
[Fig. 14]
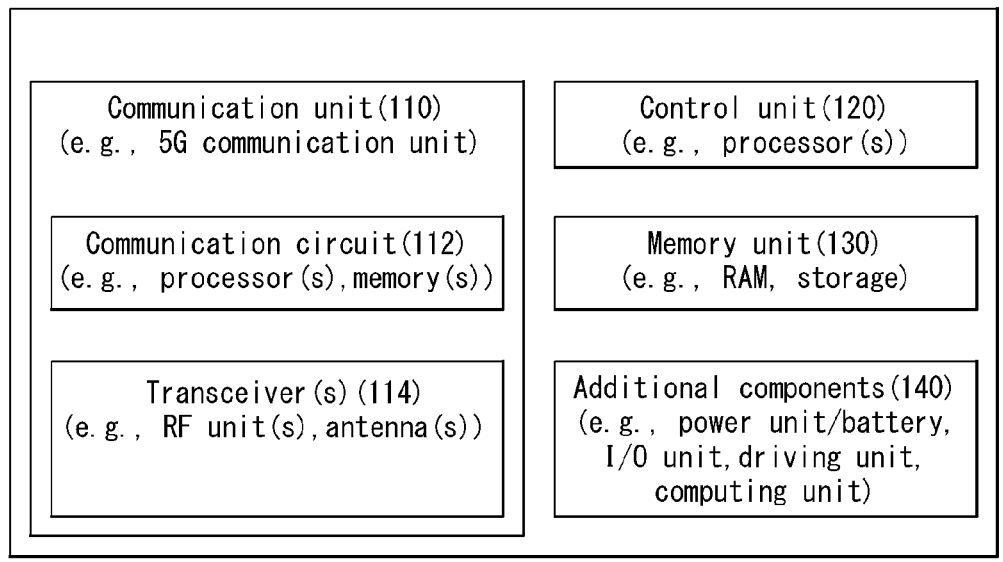

[Fig. 15]
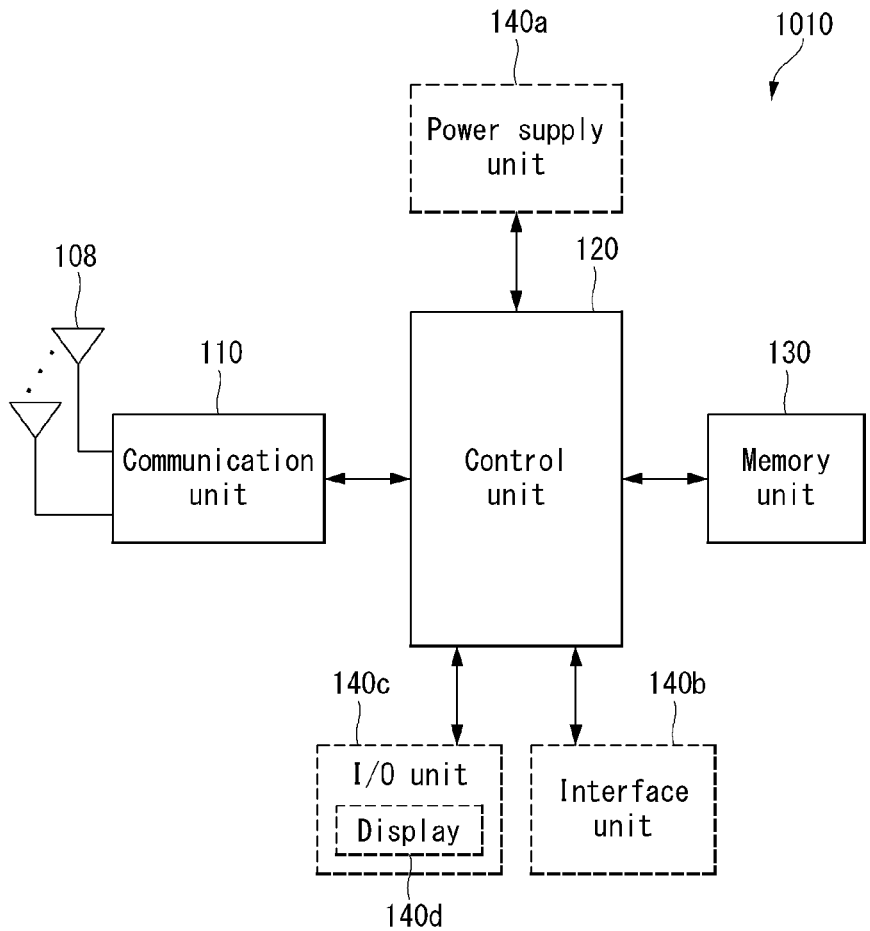
[Fig. 16]
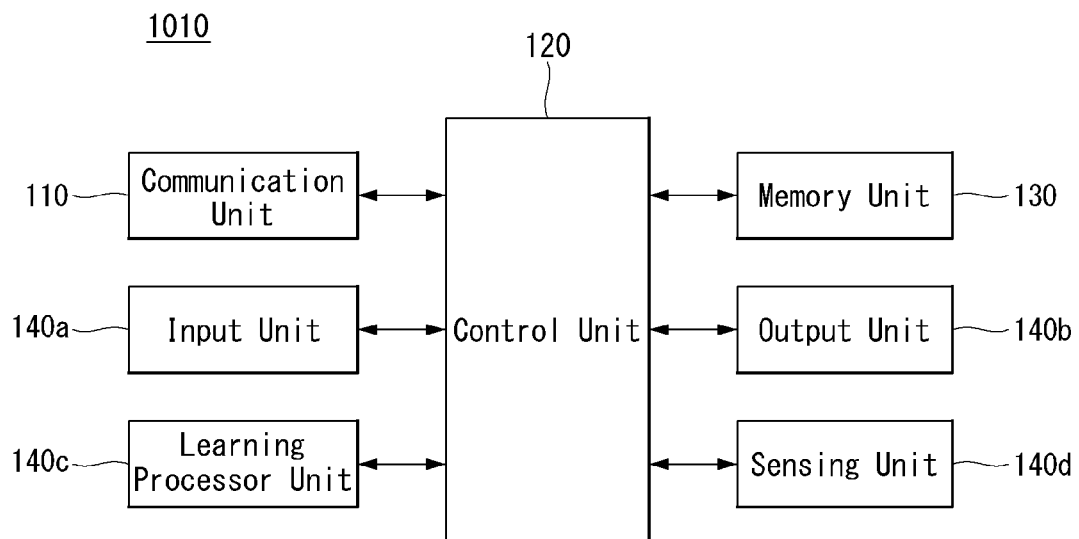

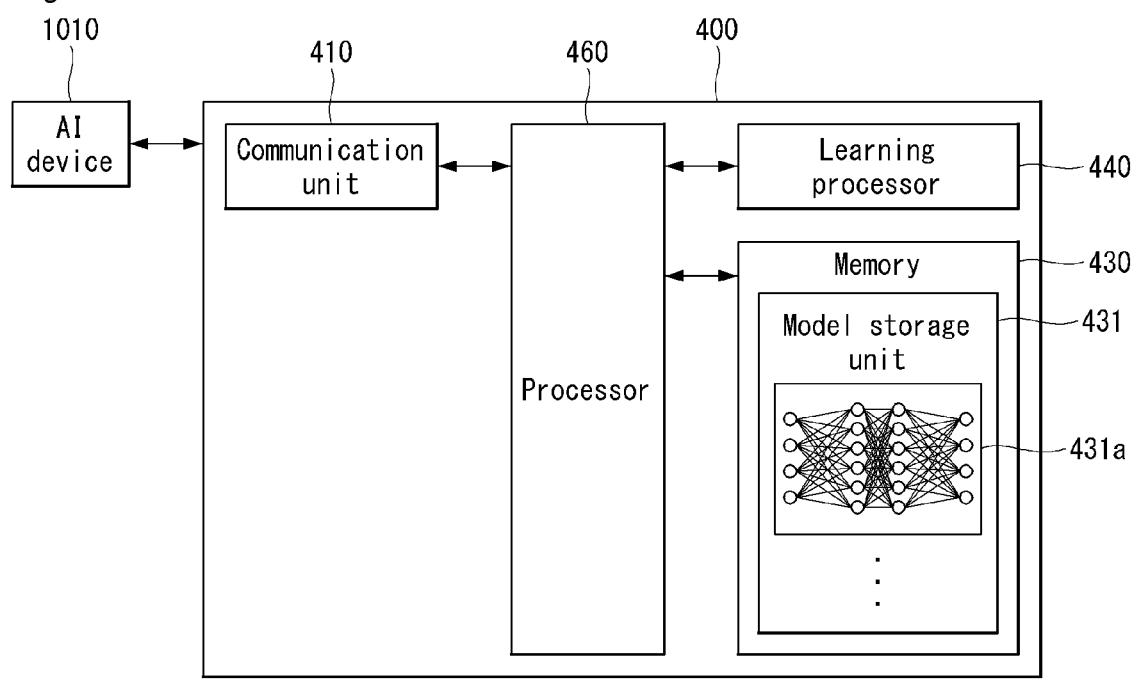
[Fig. 17]

METHOD FOR SETTING BANDWIDTH PART AND TRANSMITTING AND RECEIVING DATA IN WIRELESS COMMUNICATION SYSTEM, AND DEVICE FOR SAME

CROSS-REFERENCE TO RELATED APPLICATIONS

This application is a National Stage application under 35 U.S.C. § 371 of International Application No. PCT/KR2020/000624, filed on Jan. 13, 2020, which claims the benefit of Korean Patent Application No. 10-2019-0004207, filed on Jan. 11, 2019. The disclosures of the prior applications are incorporated by reference in their entirety.

TECHNICAL FIELD

The present disclosure relates to a wireless communication system, and more particularly, to a method of setting a bandwidth part, a method of transmitting and receiving data based on scrambling/descrambling, and a device supporting the same.

BACKGROUND ART

Mobile communication systems have been developed to provide a voice service while ensuring the activity of a user. However, in the mobile communication system, not only a voice, but also a data service is extended. At present, there is a shortage of resources due to an explosive increase in traffic, and users demand a higher speed service. As a result, a more advanced mobile communication system is required.

Requirements for a next-generation mobile communication system should be able to support the acceptance of explosive data traffic, a dramatic increase in the per-user data rate, the acceptance of a significant increase in the number of connected devices, very low end-to-end latency, and high-energy efficiency. To this end, various technologies are researched, which include dual connectivity, massive multiple input multiple output (MIMO), in-band full duplex, non-orthogonal multiple access (NOMA), super wideband support, device networking, and the like.

Technical Problem

An aspect of the present disclosure proposes methods for transmitting and receiving data in a wireless communication system.

Another aspect of the present disclosure proposes a method for transmitting and receiving data in joint transmission based on a transmission point (TP)(s) and/or a transmission and reception point (TRP)(s) of a BS(s).

Another aspect of the present disclosure proposes a scrambling and descrambling method applied to transmission and reception of data in the joint transmission described above.

Technical objects to be achieved in the present disclosure are not limited to the aforementioned technical objects, and other technical objects not described above may be evidently understood by a person having ordinary skill in the art to which the present disclosure pertains from the following description.

Technical Solution

In an aspect, a method for receiving data by a terminal in a wireless communication system, includes: receiving bandwidth part (BWP) configuration information related to a BWP; receiving information for activating a specific BWP among one or more BWPs based on the BWP configuration information; receiving configuration information related to a control resource of a physical control channel based on the activated specific BWP, wherein one or more control resources included in the configuration information are configured as a first control resource group or a second control resource group, respectively; receiving a first physical control channel and a second physical control channel based on the configuration information; receiving a first physical data channel based on the first control resource group associated with a control resource in which the first physical control channel is received; and receiving a second physical data channel based on the second control resource group associated with a control resource in which the second physical control channel is received.

The method may further include: receiving data channel configuration information for the first physical data channel and the second physical data channel, wherein the data channel configuration information includes parameter information for scrambling of the first physical data channel and the second physical data channel. The parameter information may include first scrambling identification information for the first physical data channel and second scrambling identification information for the second physical data channel. The first scrambling identification information may be associated with the first control resource group and the second scrambling identification information is associated with the second control resource group.

The method may further include: descrambling the first physical data channel and the second physical data channel based on the parameter information.

Spatial related information for receiving the physical control channel may be configured for each control resource. The spatial related information may include at least one of a quasi co-location (QCL) application related parameter, QCL type information, or QCL related reference signal information.

A terminal for receiving data in a wireless communication system, the terminal includes: one or more transceivers; one or more processors; and one or more memories configured to store instructions for operations executed by the one or more processors and connected to the one or more processors, wherein the operations include: receiving bandwidth part (BWP) configuration information related to a BWP; receiving information for activating a specific BWP among one or more BWPs based on the BWP configuration information; receiving configuration information related to a control resource of a physical control channel based on the activated specific BWP, wherein one or more control resources included in the configuration information are configured as a first control resource group or a second control resource group, respectively; receiving a first physical control channel and a second physical control channel based on the configuration information; receiving a first physical data channel based on the first control resource group associated with a control resource in which the first physical control channel is received; and receiving a second physical data channel based on the second control resource group associated with a control resource in which the second physical control channel is received.

The operations may further include: receiving data channel configuration information for the first physical data channel and the second physical data channel, wherein the data channel configuration information includes parameter information for scrambling of the first physical data channel and the second physical data channel. The parameter information may include first scrambling identification information for the first physical data channel and second scrambling identification information for the second physical data channel. The first scrambling identification information may be associated with the first control resource group and the second scrambling identification information is associated with the second control resource group.

In another aspect, a device including one or more memories and one or more processors functionally connected to the one or more memories, wherein the one or more processors is configured to control the device to receive bandwidth part (BWP) configuration information related to a BWP; receive information for activating a specific BWP among one or more BWPs based on the BWP configuration information; receive configuration information related to a control resource of a physical control channel based on the activated specific BWP, wherein one or more control resources included in the configuration information are configured as a first control resource group or a second control resource group, respectively; receive configuration information related to a control resource of a physical control channel, one or more control resources included in the configuration information being configured as a first control resource group and a second control resource group, respectively; receive a first physical control channel and a second physical control channel based on the configuration information; receive a first physical data channel based on the first control resource group associated with a control resource in which the first physical control channel is received; and receive a second physical data channel based on the second control resource group associated with a control resource in which the second physical control channel is received.

In another aspect, a computer-readable medium, as one or more non-transitory computer-readable mediums storing one or more instructions, wherein the one or more instructions executable by one or more processors instruct a terminal to receive bandwidth part (BWP) configuration information related to a BWP; to receive information for activating a specific BWP among one or more BWPs based on the BWP configuration information; to receive configuration information related to a control resource of a physical control channel based on the activated specific BWP, wherein one or more control resources included in the configuration information are configured as a first control resource group or a second control resource group, respectively; to receive a first physical control channel and a second physical control channel based on the configuration information; to receive a first physical data channel based on the first control resource group associated with a control resource in which the first physical control channel is received; and to receive a second physical data channel based on the second control resource group associated with a control resource in which the second physical control channel is received.

In another aspect, a method for transmitting data by a base station in a wireless communication system, includes: transmitting bandwidth part (BWP) configuration information related to a BWP; transmitting information for activating a specific BWP among one or more BWPs based on the BWP configuration information; transmitting configuration information related to a control resource of a physical control channel based on the activated specific BWP, wherein one or more control resources included in the configuration information are configured as a first control resource group or a second control resource group, respectively; transmitting a first physical control channel and a second physical control channel based on the configuration information; transmitting a first physical data channel based on the first control resource group associated with a control resource in which the first physical control channel is received; and transmitting a second physical data channel based on the second control resource group associated with a control resource in which the second physical control channel is received.

In another aspect, a base station for transmitting data in a wireless communication system, includes: one or more transceivers; one or more processors; and one or more memories configured to store instructions for operations executed by the one or more processors and connected to the one or more processors, wherein the operations include: transmitting bandwidth part (BWP) configuration information related to a BWP; transmitting information for activating a specific BWP among one or more BWPs based on the BWP configuration information; transmitting configuration information related to a control resource of a physical control channel based on the activated specific BWP, wherein one or more control resources included in the configuration information are configured as a first control resource group or a second control resource group, respectively; transmitting a first physical control channel and a second physical control channel based on the configuration information; transmitting a first physical data channel based on the first control resource group associated with a control resource in which the first physical control channel is received; and transmitting a second physical data channel based on the second control resource group associated with a control resource in which the second physical control channel is received.

Advantageous Effects

According to an embodiment of the present disclosure, even when a terminal receives some or all of PDSCHs from a plurality of TP/TRPs in an overlapping manner, generation of a scrambling sequence is distinguished so that a descrambling operation for the corresponding PDSCHs may be performed separately.

In addition, according to an embodiment of the present disclosure, since transmission and reception of PDSCHs are performed based on the classification of the CORESET group/pool, the PDSCHs may be efficiently transmitted and received without ambiguity of terminal operations even for joint transmission of UE(s) based on the TP/TRP(s).

Effects which may be obtained from the disclosure are not limited by the above effects, and other effects that have not been mentioned may be clearly understood from the following description by those skilled in the art to which the disclosure pertains.

DESCRIPTION OF DRAWINGS

The accompany drawings, which are included to provide a further understanding of the present disclosure and are incorporated on and constitute a part of this disclosure illustrate embodiments of the present disclosure and together with the description serve to explain the principles of the present disclosure.

FIG. 1 is a diagram illustrating an example of an overall system structure of NR to which a method proposed in the present disclosure may be applied.

FIG. 2 illustrates a relationship between an uplink frame and a downlink frame in a wireless communication system to which a method proposed in the present disclosure may be applied.

FIG. 3 illustrates an example of a frame structure in an NR system.

FIG. 4 illustrates an example of a resource grid supported by a wireless communication system to which a method proposed in the present disclosure may be applied.

FIG. 5 illustrates examples of a resource grid for each antenna port and numerology to which a method proposed in the present disclosure may be applied.

FIG. 6 illustrates physical channels and general signal transmission.

FIG. 7 shows an example of a downlink transmission/reception operation.

FIG. 8 shows an example of an uplink transmission/reception operation.

FIG. 9 shows an example of an operation flowchart of a terminal receiving data in a wireless communication system to which the method proposed in the present disclosure may be applied.

FIG. 10 shows an example of an operation flowchart of a BS transmitting data in a wireless communication system to which the method proposed in the present disclosure may be applied.

FIG. 11 illustrates a communication system applied to the present disclosure.

FIG. 12 illustrates a wireless device which may be applied to the present disclosure.

FIG. 13 illustrates a signal processing circuit for a transmit signal.

FIG. 14 illustrates another example of a wireless device applied to the present disclosure.

FIG. 15 illustrates a portable device applied to the present disclosure.

FIG. 16 illustrates an AI device applied to the present disclosure.

FIG. 17 illustrates an AI server applied to the present disclosure.

MODE FOR DISCLOSURE

Reference will now be made in detail to embodiments of the disclosure, examples of which are illustrated in the accompanying drawings. A detailed description to be disclosed below together with the accompanying drawing is to describe exemplary embodiments of the present disclosure and not to describe a unique embodiment for carrying out the present disclosure. The detailed description below includes details to provide a complete understanding of the present disclosure. However, those skilled in the art know that the present disclosure may be carried out without the details.

In some cases, in order to prevent a concept of the present disclosure from being ambiguous, known structures and devices may be omitted or illustrated in a block diagram format based on core functions of each structure and device.

Hereinafter, downlink (DL) means communication from the BS to the terminal and uplink (UL) means communication from the terminal to the BS. In downlink, a transmitter may be part of the BS, and a receiver may be part of the terminal. In uplink, the transmitter may be part of the terminal and the receiver may be part of the BS. The BS may be expressed as a first communication device and the terminal may be expressed as a second communication device. A BS (BS) may be replaced with terms including a fixed station, a Node B, an evolved-NodeB (eNB), a Next Generation NodeB (gNB), a base transceiver system (BTS), an access point (AP), a network (5G network), an AI system, a road side unit (RSU), a vehicle, a robot, an Unmanned Aerial Vehicle (UAV), an Augmented Reality (AR) device, a Virtual Reality (VR) device, and the like. Further, the terminal may be fixed or mobile and may be replaced with terms including a User Equipment (UE), a Mobile Station (MS), a user terminal (UT), a Mobile Subscriber Station (MSS), a Subscriber Station (SS), an Advanced Mobile Station (AMS), a Wireless Terminal (WT), a Machine-Type Communication (MTC) device, a Machine-to-Machine (M2M) device, and a Device-to-Device (D2D) device, the vehicle, the robot, an AI module, the Unmanned Aerial Vehicle (UAV), the Augmented Reality (AR) device, the Virtual Reality (VR) device, and the like.

The following technology may be used in various radio access system including CDMA, FDMA, TDMA, OFDMA, SC-FDMA, and the like. The CDMA may be implemented as radio technology such as Universal Terrestrial Radio Access (UTRA) or CDMA2000. The TDMA may be implemented as radio technology such as a global system for mobile communications (GSM)/general packet radio service (GPRS)/enhanced data rates for GSM evolution (EDGE). The OFDMA may be implemented as radio technology such as Institute of Electrical and Electronics Engineers (IEEE) 802.11 (Wi-Fi), IEEE 802.16 (WiMAX), IEEE 802.20, Evolved UTRA (E-UTRA), or the like. The UTRA is a part of Universal Mobile Telecommunications System (UMTS). 3rd Generation Partnership Project (3GPP) Long Term Evolution (LTE) is a part of Evolved UMTS (E-UMTS) using the E-UTRA and LTE-Advanced (A)/LTE-A pro is an evolved version of the 3GPP LTE. 3GPP NR (New Radio or New Radio Access Technology) is an evolved version of the 3GPP LTE/LTE-A/LTE-A pro.

For clarity of description, the technical spirit of the present disclosure is described based on the 3GPP communication system (e.g., LTE-A or NR), but the technical spirit of the present disclosure are not limited thereto. LTE means technology after 3GPP TS 36.xxx Release 8. In detail, LTE technology after 3GPP TS 36.xxx Release 10 is referred to as the LTE-A and LTE technology after 3GPP TS 36.xxx Release 13 is referred to as the LTE-A pro. The 3GPP NR means technology after TS 38.xxx Release 15. The LTE/NR may be referred to as a 3GPP system. "xxx" means a detailed standard document number. The LTE/NR may be collectively referred to as the 3GPP system. Matters disclosed in a standard document opened before the present disclosure may be referred to for a background art, terms, omissions, etc., used for describing the present disclosure. For example, the following documents may be referred to.

3GPP LTE
   36.211: Physical channels and modulation
   36.212: Multiplexing and channel coding
   36.213: Physical layer procedures
   36.300: Overall description
   36.331: Radio Resource Control (RRC)

3GPP NR
   38.211: Physical channels and modulation
   38.212: Multiplexing and channel coding
   38.213: Physical layer procedures for control
   38.214: Physical layer procedures for data
   38.300: NR and NG-RAN Overall Description
   36.331: Radio Resource Control (RRC) protocol specification As more and more communication devices require larger communication capacity, there is a need for improved mobile broadband communication compared to the existing radio access technology (RAT). Further, massive machine type communications (MTCs), which provide various services anytime and anywhere by connecting many devices and objects, are one of the major issues to be considered in the next generation communication. In addition, a communication system design considering a service/UE sensitive to reliability and latency is being discussed. The introduction of next generation radio access technology considering enhanced mobile broadband communication (eMBB), massive MTC (mMTC), ultra-reliable and low latency communication (URLLC) is discussed, and in the present disclosure, the technology is called new RAT for convenience. The NR is an expression representing an example of 5G radio access technology (RAT).

Three major requirement areas of 5G include (1) an enhanced mobile broadband (eMBB) area, (2) a massive machine type communication (mMTC) area and (3) an ultra-reliable and low latency communications (URLLC) area.

Some use cases may require multiple areas for optimization, and other use case may be focused on only one key performance indicator (KPI). 5G support such various use cases in a flexible and reliable manner.

eMBB is far above basic mobile Internet access and covers media and entertainment applications in abundant bidirectional tasks, cloud or augmented reality. Data is one of key motive powers of 5G, and dedicated voice services may not be first seen in the 5G era. In 5G, it is expected that voice will be processed as an application program using a data connection simply provided by a communication system. Major causes for an increased traffic volume include an increase in the content size and an increase in the number of applications that require a high data transfer rate. Streaming service (audio and video), dialogue type video and mobile Internet connections will be used more widely as more devices are connected to the Internet. Such many application programs require connectivity always turned on in order to push real-time information and notification to a user. A cloud storage and application suddenly increases in the mobile communication platform, and this may be applied to both business and entertainment. Furthermore, cloud storage is a special use case that tows the growth of an uplink data transfer rate. 5G is also used for remote business of cloud. When a tactile interface is used, further lower end-to-end latency is required to maintain excellent user experiences. Entertainment, for example, cloud game and video streaming are other key elements which increase a need for the mobile broadband ability. Entertainment is essential in the smartphone and tablet anywhere including high mobility environments, such as a train, a vehicle and an airplane. Another use case is augmented reality and information search for entertainment. In this case, augmented reality requires very low latency and an instant amount of data.

Furthermore, one of the most expected 5G use case relates to a function capable of smoothly connecting embedded sensors in all fields, that is, mMTC. Until 2020, it is expected that potential IoT devices will reach 20.4 billions. The industry IoT is one of areas in which 5G performs major roles enabling smart city, asset tracking, smart utility, agriculture and security infra.

URLLC includes a new service which will change the industry through remote control of major infra and a link having ultra reliability/low available latency, such as a self-driving vehicle. A level of reliability and latency is essential for smart grid control, industry automation, robot engineering, drone control and adjustment.

Multiple use cases are described more specifically.

5G may supplement fiber-to-the-home (FTTH) and cable-based broadband (or DOCSIS) as means for providing a stream evaluated from gigabits per second to several hundreds of mega bits per second. Such fast speed is necessary to deliver TV with resolution of 4K or more (6K, 8K or more) in addition to virtual reality and augmented reality. Virtual reality (VR) and augmented reality (AR) applications include immersive sports games. A specific application program may require a special network configuration. For example, in the case of VR game, in order for game companies to minimize latency, a core server may need to be integrated with the edge network server of a network operator.

An automotive is expected to be an important and new motive power in 5G, along with many use cases for the mobile communication of an automotive. For example, entertainment for a passenger requires a high capacity and a high mobility mobile broadband at the same time. The reason for this is that future users continue to expect a high-quality connection regardless of their location and speed. Another use example of the automotive field is an augmented reality dashboard. The augmented reality dashboard overlaps and displays information, identifying an object in the dark and notifying a driver of the distance and movement of the object, over a thing seen by the driver through a front window. In the future, a wireless module enables communication between automotives, information exchange between an automotive and a supported infrastructure, and information exchange between an automotive and other connected devices (e.g., devices accompanied by a pedestrian). A safety system guides alternative courses of a behavior so that a driver may drive more safely, thereby reducing a danger of an accident. A next step will be a remotely controlled or self-driven vehicle. This requires very reliable, very fast communication between different self-driven vehicles and between an automotive and infra. In the future, a self-driven vehicle may perform all driving activities, and a driver will be focused on things other than traffic, which cannot be identified by an automotive itself. Technical requirements of a self-driven vehicle require ultra-low latency and ultra-high speed reliability so that traffic safety is increased up to a level which cannot be achieved by a person.

A smart city and smart home mentioned as a smart society will be embedded as a high-density radio sensor network. The distributed network of intelligent sensors will identify the cost of a city or home and a condition for energy-efficient maintenance. A similar configuration may be performed for each home. All of a temperature sensor, a window and heating controller, a burglar alarm and home appliances are wirelessly connected. Many of such sensors are typically a low data transfer rate, low energy and a low cost. However, for example, real-time HD video may be required for a specific type of device for surveillance.

The consumption and distribution of energy including heat or gas are highly distributed and thus require automated control of a distributed sensor network. A smart grid collects information, and interconnects such sensors using digital information and a communication technology so that the sensors operate based on the information. The information may include the behaviors of a supplier and consumer, and thus the smart grid may improve the distribution of fuel, such as electricity, in an efficient, reliable, economical, production-sustainable and automated manner. The smart grid may be considered to be another sensor network having small latency.

A health part owns many application programs which reap the benefits of mobile communication. A communication system may support remote treatment providing clinical treatment at a distant place. This helps to reduce a barrier for the distance and may improve access to medical services which are not continuously used at remote farming areas. Furthermore, this is used to save life in important treatment and an emergency condition. A radio sensor network based on mobile communication may provide remote monitoring and sensors for parameters, such as the heart rate and blood pressure.

Radio and mobile communication becomes increasingly important in the industry application field. Wiring requires a high installation and maintenance cost. Accordingly, the possibility that a cable will be replaced with reconfigurable radio links is an attractive opportunity in many industrial fields. However, to achieve the possibility requires that a radio connection operates with latency, reliability and capacity similar to those of the cable and that management is simplified. Low latency and a low error probability is a new requirement for a connection to 5G.

Logistics and freight tracking is an important use case for mobile communication, which enables the tracking inventory and packages anywhere using a location-based information system. The logistics and freight tracking use case typically requires a low data speed, but a wide area and reliable location information.

In a new RAT system including NR uses an OFDM transmission scheme or a similar transmission scheme thereto. The new RAT system may follow OFDM parameters different from OFDM parameters of LTE. Alternatively, the new RAT system may follow numerology of conventional LTE/LTE-A as it is or have a larger system bandwidth (e.g., 100 MHz). Alternatively, one cell may support a plurality of numerologies. In other words, UEs that operate with different numerologies may coexist in one cell.

The numerology corresponds to one subcarrier spacing in a frequency domain. Different numerologies may be defined by scaling reference subcarrier spacing to an integer N.

Definition of Terms eLTE eNB: The eLTE eNB is the evolution of eNB that supports connectivity to EPC and NGC.

gNB: A node which supports the NR as well as connectivity to NGC.

New RAN: A radio access network which supports either NR or E-UTRA or interfaces with the NGC.

Network slice: A network slice is a network created by the operator customized to provide an optimized solution for a specific market scenario which demands specific requirements with end-to-end scope.

Network function: A network function is a logical node within a network infrastructure that has well-defined external interfaces and well-defined functional behavior.

NG-C: A control plane interface used on NG2 reference points between new RAN and NGC.

NG-U: A user plane interface used on NG3 references points between new RAN and NGC.

Non-standalone NR: A deployment configuration where the gNB requires an LTE eNB as an anchor for control plane connectivity to EPC, or requires an eLTE eNB as an anchor for control plane connectivity to NGC.

Non-standalone E-UTRA: A deployment configuration where the eLTE eNB requires a gNB as an anchor for control plane connectivity to NGC.

User plane gateway: A termination point of NG-U interface.

Overview System

FIG. 1 illustrates an example of an overall structure of a NR system to which a method proposed in the present disclosure is applicable.

Referring to FIG. 1, an NG-RAN consists of gNBs that provide an NG-RA user plane (new AS sublayer/PDCP/RLC/MAC/PHY) and control plane (RRC) protocol terminations for a user equipment (UE).

The gNBs are interconnected with each other by means of an Xn interface.

The gNBs are also connected to an NGC by means of an NG interface.

More specifically, the gNBs are connected to an access and mobility management function (AMF) by means of an N2 interface and to a user plane function (UPF) by means of an N3 interface.

NR(New Rat) Numerology and Frame Structure

In the NR system, multiple numerologies may be supported. The numerologies may be defined by subcarrier spacing and a CP (Cyclic Prefix) overhead. Spacing between the plurality of subcarriers may be derived by scaling basic subcarrier spacing into an integer N (or μ). In addition, although a very low subcarrier spacing is assumed not to be used at a very high subcarrier frequency, a numerology to be used may be selected independent of a frequency band.

In addition, in the NR system, a variety of frame structures according to the multiple numerologies may be supported.

Hereinafter, an orthogonal frequency division multiplexing (OFDM) numerology and a frame structure, which may be considered in the NR system, will be described.

A plurality of OFDM numerologies supported in the NR system may be defined as in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

The NR supports multiple numerologies (or subcarrier spacing (SCS)) for supporting various 5G services. For example, when the SCS is 15 kHz, a wide area in traditional cellular bands is supported and when the SCS is 30 kHz/60 kHz, dense-urban, lower latency, and wider carrier bandwidth are supported, and when the SCS is more than 60 kHz, a bandwidth larger than 24.25 GHz is supported in order to overcome phase noise.

An NR frequency band is defined as frequency ranges of two types (FR1 and FR2). FR1 and FR2 may be configured as shown in Table 2 below. Further, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in the NR system, a size of various fields in the time domain is expressed as a multiple of a time unit of $T_s=1/(\Delta f_{max} \cdot N_f)$. In this case, $\Delta f_{max}=480 \cdot 10^3$, and $N_f=4096$. DL and UL transmission is configured as a radio frame having a section of $T_f=(\Delta f_{max} N_f/100) \cdot T_s=10$ ms. The radio frame is composed of ten subframes each having a section of $T_{sf}=(\Delta f_{max}N_f/1000)\cdot T_s=1$ ms In this case, there may be a set of UL frames and a set of DL frames.

FIG. 2 illustrates a relation between an uplink frame and a downlink frame in a wireless communication system to which a method proposed in the present disclosure is applicable.

As illustrated in FIG. 2, uplink frame number i for transmission from a user equipment (UE) shall start $T_{TA}=N_{TA}T_s$ before the start of a corresponding downlink frame at the corresponding UE.

Regarding the numerology μ, slots are numbered in increasing order of $n_s^\mu \in \{0, \ldots, N_{subframe}^{slots,\mu}-1\}$ within a subframe and are numbered in increasing order of $n_{s,f}^\mu \in \{0, \ldots, N_{frame}^{slots,\mu}-1\}$ within a radio frame. One slot consists of consecutive OFDM symbols of $N_{symb}^\mu$, and $N_{symb}^\mu$ is determined depending on a numerology used and slot configuration. The start of slots $n_s^\mu$ in a subframe is aligned in time with the start of OFDM symbols $n_s^\mu N_{symb}^\mu$ in the same subframe.

Not all UEs are able to transmit and receive at the same time, and this means that not all OFDM symbols in a downlink slot or an uplink slot are available to be used.

Table 3 represents the number $N_{symb}^{slot}$ of OFDM symbols per slot, the number $N_{slot}^{frame,\mu}$ of slots per radio frame, and the number $N_{slot}^{subframe,\mu}$ of slots per subframe in a normal CP. Table 4 represents the number of OFDM symbols per slot, the number of slots per radio frame, and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 3 illustrates an example of a frame structure in a NR system. FIG. 3 is merely for convenience of explanation and does not limit the scope of the present disclosure.

In Table 4, in case of μ=2, i.e., as an example in which a subcarrier spacing (SCS) is 60 kHz, one subframe (or frame) may include four slots with reference to Table 3, and one subframe={1, 2, 4} slots shown in FIG. 3, for example, the number of slot(s) that may be included in one subframe may be defined as in Table 3.

Further, a mini-slot may consist of 2, 4, or 7 symbols, or may consist of more symbols or less symbols.

In regard to physical resources in the NR system, an antenna port, a resource grid, a resource element, a resource block, a carrier part, etc. May be considered.

Hereinafter, the above physical resources that may be considered in the NR system are described in more detail.

First, in regard to an antenna port, the antenna port is defined so that a channel over which a symbol on an antenna port is conveyed may be inferred from a channel over which another symbol on the same antenna port is conveyed. When large-scale properties of a channel over which a symbol on one antenna port is conveyed may be inferred from a channel over which a symbol on another antenna port is conveyed, the two antenna ports may be regarded as being in a quasi co-located or quasi co-location (QC/QCL) relation. Here, the large-scale properties may include at least one of delay spread, Doppler spread, frequency shift, average received power, and received timing.

FIG. 4 illustrates an example of a resource grid supported in a wireless communication system to which a method proposed in the present disclosure is applicable.

Referring to FIG. 4, a resource grid consists of $N_{RB}^\mu N_{sc}^{RB}$ subcarriers on a frequency domain, each subframe consisting of 14·2μ OFDM symbols, but the present disclosure is not limited thereto.

In the NR system, a transmitted signal is described by one or more resource grids, consisting of $N_{RB}^\mu N_{sc}^{RB}$ subcarriers, and $2^\mu N_{symb}^{(\mu)}$ OFDM symbols, where $N_{RB}^\mu \leq N_{RB}^{max,\mu}$, $N_{RB}^{max,\mu}$ denotes a maximum transmission bandwidth and may change not only between numerologies but also between uplink and downlink.

In this case, as illustrated in FIG. 5, one resource grid may be configured per numerology μ and antenna port p.

FIG. 5 illustrates examples of a resource grid per antenna port and numerology to which a method proposed in the present disclosure is applicable.

Each element of the resource grid for the numerology μ and the antenna port p is called a resource element and is uniquely identified by an index pair (k, l̄), where k=0, ..., $N_{RB}^\mu N_{sc}^{RB}-1$ is an index on a frequency domain, and l=0, ..., $2^\mu N_{symb}^{(\mu)}-1$ refers to a location of a symbol in a subframe. The index pair (k,l) is used to refer to a resource element in a slot, where l=0, ..., $N_{symb}^\mu - 1$.

The resource element (k,l̄) for the numerology μ and the antenna port p corresponds to a complex value $a_{k,\bar{l}}^{(p,\mu)}$. When there is no risk for confusion or when a specific antenna port or numerology is not specified, the indices p and μ may be dropped, and as a result, the complex value may be $a_{k,\bar{l}}^{(p)}$ or $a_{k,\bar{l}}$.

Further, a physical resource block is defined as N: =12 consecutive subcarriers in the frequency domain.

Point A serves as a common reference point of a resource block grid and may be obtained as follows.
  offsetToPointA for PCell downlink represents a frequency offset between the point A and a lowest subcarrier of a lowest resource block that overlaps a SS/PBCH block used by the UE for initial cell selection, and is expressed in units of resource blocks assuming 15 kHz subcarrier spacing for FR1 and 60 kHz subcarrier spacing for FR2;
  absoluteFrequencyPointA represents frequency-location of the point A expressed as in absolute radio-frequency channel number (ARFCN);

The common resource blocks are numbered from 0 and upwards in the frequency domain for subcarrier spacing configuration μ.

The center of subcarrier 0 of common resource block 0 for the subcarrier spacing configuration μ coincides with "point A". A common resource block number $n_{CRB}^\mu$ in the frequency domain and resource elements (k, l) for the subcarrier spacing configuration μ may be given by the following Equation 1.

$$n_{CRB}^\mu = \left\lfloor \frac{k}{N_{sc}^{RB}} \right\rfloor \quad \text{[Equation 1]}$$

Here, k may be defined relative to the point A so that k=0 corresponds to a subcarrier centered around the point A. Physical resource blocks are defined within a bandwidth part (BWP) and are numbered from 0 to $N_{BWP,i}^{size}-1$, where i is No. Of the BWP. A relation between the physical resource block $n_{PRB}$ in BWP i and the common resource block nCR may be given by the following Equation 2.

$$n_{BRD} = n_{PRB} + N_{BWP,i}^{start}$$

Here, $N_{BWP,i}^{start}$ may be the common resource block where the BWP starts relative to the common resource block 0.

Bandwidth Part (BWP)

An NR system may be supported up to a maximum of 400 MHz per one component carrier (CC). In a UE operating in such a wideband CC, if the RF for all CCs is always turned on, UE battery consumption may increase. Alternatively, when several use cases (e.g., eMBB, URLLC, Mmtc, etc) operating within one wideband CC are taken into consideration, a different numerology (e.g., sub-carrier spacing) may be supported for each frequency band within a corresponding CC. Alternatively, a capability for a maximum of bandwidth may be different for each UE. By taking this into consideration, a base station may instruct a UE to operate only in some bandwidths not a full bandwidth of a wideband CC. Corresponding some bandwidths are defined as a bandwidth part (BWP) for convenience sake. The BWP may be configured with resource blocks (RB) contiguous in a frequency axis, and may correspond to one numerology (e.g., sub-carrier spacing, CP length, slot/mini-slot duration).

Meanwhile, a base station may configure multiple BWPs even within one CC configured in a UE. For example, in a PDCCH monitoring slot, a BWP occupying a relatively small frequency domain may be configured. A PDSCH indicated in a PDCCH may be scheduled on a BWP greater than the BWP. Alternatively, if UEs gather in a specific BWP, for load balancing, some UEs may be configured with other BWP. Alternatively, some spectra of a full bandwidth may be excluded and BWPs on both sides may be configured within the same slot by taking into consideration frequency domain inter-cell interference cancellation between neighboring cells. That is, a base station may configure at least one DL/UL BWP in a UE associated with a wideband CC, may activate at least one DL/UL BWP of DL/UL BWP(s) configured at specific timing (by L1 signaling or MAC CE or RRC signaling). Switching may be indicated (by L1 signaling or MAC CE or RRC signaling) by another configured DL/UL BWP. Alternatively, if a timer value expires based on a timer, switching may be performed on a predetermined DL/UL BWP. In this case, an activated DL/UL BWP is defined as an active DL/UL BWP. However, if a UE is in an initial access process or in a situation, such as before an RRC connection is set up, the UE may not receive a configuration for a DL/UL BWP. In such a situation, a DL/UL BWP assumed by the UE is defined as an initial active DL/UL BWP.

Physical Channel and General Signal Transmission

FIG. 6 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S601). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S602).

Meanwhile, when there is no radio resource first accessing the eNB or for signal transmission, the UE may perform a Random Access Procedure (RACH) to the eNB (S603 to S606). To this end, the UE may transmit a specific sequence to a preamble through a Physical Random Access Channel (PRACH) (S603 and S605) and receive a response message (Random Access Response (RAR) message) for the preamble through the PDCCH and a corresponding PDSCH. In the case of a contention based RACH, a Contention Resolution Procedure may be additionally performed (S606).

The UE that performs the above procedure may then perform PDCCH/PDSCH reception (S607) and Physical Uplink Shared Channel (PUSCH)/Physical Uplink Control Channel (PUCCH) transmission (S608) as a general uplink/downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Downlink Transmission and Reception Operation

FIG. 7 illustrates an example of a downlink transmission and reception operation.

The eNB may schedule downlink transmission such as the frequency/time resource, the transport layer, an downlink precoder, the MCS, etc., (S701). As one example, the eNB may determine a beam for PDSCH transmission to the UE.

The UE may receive Downlink Control Information (DCI) for downlink scheduling (i.e., including scheduling information of the PDSCH) on the PDCCH (S702).

DCI format 1_0 or DCI format 11 may be used for the downlink scheduling and DCI format 1_1 may include information such as the following examples. For example, DCI format 1_1 includes at least one of Identifier for DCI formats, Bandwidth part indicator, Frequency domain resource assignment, Time domain resource assignment, PRB bundling size indicator, Rate matching indicator, ZP CSI-RS tigger, Antenna port(s), Transmission configuration indication (TCI), SRS request, and Demodulation Reference Signal (DMRS) sequence initialization.

In particular, according to each state indicated in an antenna port(s) field, the number of DMRS ports may be scheduled, and single-user (SU)/Multi-user (MU) transmission scheduling is also available.

Further, a TCI field is configured with 3 bits, and the QCL for the DMRS may be dynamically indicated by indicating a maximum of 8 TCI states according to a TCI field value.

The UE may receive downlink data from the eNB on the PDSCH (S703).

When the UE detects a PDCCH including the DCI format 1_0 or 1_1, the UE may decode the PDSCH according to the indication by the corresponding DCI.

Here, when the UE receives a PDSCH scheduled by DCI format 1, a DMRS configuration type may be configured by higher layer parameter "dmrs-Type" in the UE and the DMRS type is used for receiving the PDSCH. Further, in the UE, the maximum number of front-loaded DMRS symbols for the PDSCH may be configured by higher layer parameter "maxLength."

In the case of DMRS configuration type 1, when a single codeword is scheduled and an antenna port mapped to an index of {2, 9, 10, 11, or 30} is designated in the UE or when two codewords are scheduled in the UE, the UE assumes that all remaining orthogonal antenna ports are not associated with PDSCH transmission to another UE. Alternatively, in the case of DMRS configuration type 2, when a single codeword is scheduled and an antenna port mapped to an index of {2, 10, or 23} is designated in the UE or when two codewords are scheduled in the UE, the UE assumes that all remaining orthogonal antenna ports are not related to PDSCH transmission to another UE.

When the UE receives the PDSCH, a precoding granularity P' may be assumed as a consecutive resource block in the frequency domain. Here, P' may correspond to one value of {2, 4, and wideband}. When P' is determined as wideband, the UE does not predict that the PDSCH is scheduled to non-contiguous PRBs and the UE may assume that the same precoding is applied to the allocated resource. On the contrary, when P' is determined as any one of {2 and 4}, a Precoding Resource Block (PRG) is split into P' consecutive PRBs. The number of actually consecutive PRBs in each PRG may be one or more. The UE may assume that the same precoding is applied to consecutive downlink PRBs in the PRG.

In order to determine a modulation order in the PDSCH, a target code rate, and a transport block size, the UE may first read a 5-bit MCD field in the DCI and determine the modulation order and the target code rate. In addition, the UE may read a redundancy version field in the DCI and determine a redundancy version. In addition, the UE may determine the transport block size by using the number of layers before rate matching and the total number of allocated PRBs.

Uplink Transmission and Reception Operation

FIG. 8 illustrates an example of an uplink transmission and reception operation.

The eNB may schedule uplink transmission such as the frequency/time resource, the transport layer, an uplink precoder, the MCS, etc., (S801). In particular, the eNB may determine a beam for PUSCH transmission of the UE.

The UE may receive, from the eNB, DCI for downlink scheduling (i.e., including scheduling information of the PUSCH) on the PDCCH (S802).

DCI format 0_0 or 0_1 may be used for the uplink scheduling and in particular, DCI format 0_1 may include information such as the following examples. For example, DCI format 0_1 may include at least one of Identifier for DCI formats, UL/Supplementary uplink (SUL) indicator, Bandwidth part indicator, Frequency domain resource assignment, Time domain resource assignment, Frequency hopping flag, Modulation and coding scheme (MCS), SRS resource indicator (SRI), Precoding information and number of layers, Antenna port(s), SRS request, DMRS sequence initialization, and Uplink Shared Channel (UL-SCH) indicator.

In particular, configured SRS resources in an SRS resource set associated with higher layer parameter "usage" may be indicated by an SRS resource indicator field. Further, "spatialRelationInfo" may be configured for each SRS resource and a value of "spatialRelationInfo" may be one of {CRI, SSB, and SRI}.

The UE may transmit the uplink data to the eNB on the PUSCH (S803).

When the UE detects a PDCCH including DCI format 0_0 or 0_1, the UE may transmit the corresponding PUSCH according to the indication by the corresponding DCI.

Codebook based transmission scheme and non-codebook based transmission scheme are supported for PUSCH transmission.

i) When higher layer parameter txConfig" is set to "codebook", the UE is configured to the codebook based transmission. On the contrary, when higher layer parameter txConfig" is set to "nonCodebook", the UE is configured to the non-codebook based transmission. When higher layer parameter "txConfig" is not configured, the UE does not predict that the PUSCH is scheduled by DCI format 0_1. When the PUSCH is scheduled by DCI format 0_0, the PUSCH transmission is based on a single antenna port.

In the case of the codebook based transmission, the PUSCH may be scheduled by DCI format 0_0, DCI format 0_1, or semi-statically. When the PUSCH is scheduled by DCI format 0_1, the UE determines a PUSCH transmission precoder based on the SRI, the Transmit Precoding Matrix Indicator (TPMI), and the transmission rank from the DCI as given by the SRS resource indicator and the Precoding information and number of layers field. The TPMI is used for indicating a precoder to be applied over the antenna port and when multiple SRS resources are configured, the TPMI corresponds to the SRS resource selected by the SRI.

Alternatively, when the single SRS resource is configured, the TPMI is used for indicating the precoder to be applied over the antenna port and corresponds to the corresponding single SRS resource. A transmission precoder is selected from an uplink codebook having the same antenna port number as higher layer parameter "nrofSRS-Ports". When the UE is set to higher layer parameter "txConfig" set to "codebook", at least one SRS resource is configured in the UE. An SRI indicated in slot n is associated with most recent transmission of the SRS resource identified by the SRI and here, the SRS resource precedes PDCCH (i.e., slot n) carrying the SRI.

ii) In the case of the non-codebook based transmission, the PUSCH may be scheduled by DCI format 0_0, DCI format 0_1, or semi-statically. When multiple SRS resources are configured, the UE may determine the PUSCH precoder and the transmission rank based on a wideband SRI and here, the SRI is given by the SRS resource indicator in the DCI or given by higher layer parameter "srs-ResourceIndicator". The UE may use one or multiple SRS resources for SRS transmission and here, the number of SRS resources may be configured for simultaneous transmission in the same RB based on the UE capability. Only one SRS port is configured for each SRS resource. Only one SRS resource may be configured to higher layer parameter "usage" set to "nonCodebook". The maximum number of SRS resources which may be configured for non-codebook based uplink transmission is 4. The SRI indicated in slot n is associated with most recent transmission of the SRS resource identified by the SRI and here, the SRS transmission precedes PDCCH (i.e., slot n) carrying the SRI.

Quasi-Co Location (QCL)

An antenna port is defined so that a channel in which symbols on an antenna port are carried is inferred from a channel in which other symbols on the same antenna port are carried. If the property of a channel in which symbols on one antenna port are carried may be inferred from a channel in which symbols on another antenna port are carried, the two antenna ports may be said to have a quasi co-located or quasi co-location (QC/QCL) relation.

In this case, the channel property includes one or more of delay spread, Doppler spread, a frequency/Doppler shift, average received power, received timing/average delay, and a spatial RX parameter. In this case, the spatial Rx parameter means a spatial (reception) channel property parameter, such as an angle of arrival.

A UE may be configured with a list of up to M TCI-State configurations within a higher layer parameter PDSCH-Config in order to decode a PDSCH based on a detected PDCCH having DCI intended for the corresponding UE and a given serving cell. The M depends on the UE capability.

Each of the TCI-States includes a parameter for setting a quasi co-location relation between one or two DL reference signals and the DM-RS port of a PDSCH.

The quasi co-location relation is configured with a higher layer parameter qcl-Type1 for the first DL RS and qcl-Type2 (if configured) for the second DL RS. In the case of the two DL RSs, QCL types are the same regardless of whether a reference is the same DL RS or different DL RS or not.

A quasi co-location type corresponding to each DL RS is given by the higher layer parameter qd-Type of QCL-Info, and may adopt one of the following values:

"QCL-TypeA": {Doppler shift, Doppler spread, average delay, delay spread}
"QCL-TypeB": {Doppler shift, Doppler spread}
"QCL-TypeC": {Doppler shift, average delay}
"QCL-TypeD": {Spatial Rx parameter}

For example, if a target antenna port is a specific NZP CSI-RS, it may be indicated/configured that corresponding NZP CSI-RS antenna ports have been QCLed with a specific TRS from a QCL-Type A viewpoint and OCLed with a specific SSB from a QCL-Type D viewpoint. A UE that has received such an indication/configuration may receive a corresponding NZP CSI-RS using a Doppler, delay value measured in a QCL-Type A TRS, and may apply, to corresponding NZP CSI-RS reception, an Rx beam used for QCL-Type D SSB reception.

A UE may receive an activation command based on MAC CE signaling used to map up to 8 TCI states to the code point of a DCI field "Transmission Configuration Indication."

In the present disclosure, "/" may mean that all the contents separated by "/" are included (and) or only some of the separated contents are included (or). In addition, in this disclosure, the following terms are used in a unified manner for convenience of description. However, the use of these terms does not limit the technical scope of the present disclosure.

A base station (BS) described in the present disclosure may be a generic term for an object that transmits/receives data to and from a terminal (or a user equipment (UE)). For example, the BS described herein may be a concept including one or more transmission points (TP), one or more transmission and reception points (TRP), and the like. For example, multiple TPs and/or multiple TRPs described herein may be included in one BS or included in multiple BSs. In addition, the TP and/or TRP may include a panel of a BS, a transmission and reception unit, and the like.

When the BS transmits and receives data (e.g., DL-SCH, PDSCH, etc.) to and from the terminal, a non-coherent joint transmission (NCJT) scheme may be considered. Here, NCJT may refer to joint transmission that does not consider interference (i.e., joint transmission without interference). As an example, NCJT may be a method for the BS(s) to transmit data to one terminal through multiple TPs using the same time resource and frequency resource. In the case of this scheme, multiple TPs of the BS(s) may be configured to transmit data to the terminal through different layers using different demodulation reference signal (DMRS) ports.

The BS may deliver (or transmit) information for scheduling the corresponding data to the terminal which receives data or the like based on the NCJT method through downlink control information (DCI). In this case, a method in which the BS(s) participating in the NCJT scheme transmits, through DCI, scheduling information for data transmitted by itself through each TP may be referred to as a multi-DCI-based NCJT. In contrast, a method in which a representative TP among TPs of the BS(s) participating in the NCJT scheme transmits, through one DCI, scheduling information for data transmitted by itself and data transmitted through other TP(s) may be referred to as single-DCI-based NCJT. The embodiments and methods described in the present disclosure are mainly described based on the single-DCI-based NCJT, but of course, they may be extended and applied to the multi-DCI-based NCJT.

In addition, in relation to the aforementioned method, a configuration and/or indication method may be different according to the degree of overlapping of time resources and/or frequency resources. As an example, an NCJT scheme in which time resources and frequency resources used for transmission by each BS are completely overlapped may be referred to as a fully overlapped NCJT scheme.

In addition, an NCJT scheme in which time resources and/or frequency resources used by each BS for transmission are partially overlapped may be referred to as a partially overlapped NCJT (NCJT) scheme. This is only for convenience of description in the present disclosure, and the terms described above in the embodiments and methods to be described below may be replaced with other terms having the same technical meaning. For example, in the case of the partially overlapped NCJT, both data of a first BS (e.g., TP 1) and data of a second BS (e.g., TP 2) may be transmitted in some time resources and/or frequency resources, and only data of any one of the first BS or the second BS may be transmitted in the remaining time resources and/or frequency resources.

Hereinafter, in the present disclosure, methods that may be proposed when considering joint transmission (e.g., NCJT) between a plurality of BSs (e.g., multiple TP/TRPs of one or more BSs, etc.) and a terminal in a wireless communication system will be described. Hereinafter, the methods described in this disclosure are described based on one or more TP/TRPs of the BS(s), but the corresponding methods may also be applied in the same or similar manner to transmission based on one or more panels of the BS(s).

Hereinafter, the present disclosure proposes a scrambling method and/or descrambling method that may be considered for a downlink channel (e.g., PDSCH, PDCCH, etc.) in performing the aforementioned joint transmission. As an example, in relation to joint transmission between a plurality of BSs (e.g., multiple TP/TRPs of one or more BSs, etc.) and a terminal described above, a method of scrambling/descrambling a PDSCH (hereinafter, a first embodiment) in the case of joint transmission based on multiple DCIs, a method of scrambling/descrambling a PDSCH (hereinafter, a second embodiment) in the case of joint transmission based on a single DCI, and a method of scrambling/descrambling a PDCCH (hereinafter, a third embodiment) will be described.

The embodiments and/or methods described below are only classified for convenience of description, and do not limit the scope of the present disclosure. For example, some components of one embodiment may be substituted with some components of another embodiment or may be combined with each other to be applied.

First Embodiment

In the present embodiment, for convenience of explanation, in joint transmission based on multiple DCIs, data transmitted from a first TP/TRP is referred to as a first PDSCH and data transmitted from a second TP/TRP is referred to as a second PDSCH. In the present embodiment, the transmission of two PDSCHs is described, but the method described below may be extended and applied to transmission of a plurality of PDSCHs. As described above, the first TP/TRP and the second TP/TRP may be included (or implemented) in one BS or may be included in different BSs, respectively. In the present disclosure, the PDSCH is a channel for data transmission and may be replaced with an expression such as downlink data and/or a codeword.

The first PDSCH and the second PDSCH may be transmitted by overlapping some or all of the resources. In other words, the first PDSCH and the second PDSCH may be transmitted based on any one of the fully overlapped NCJT or partially overlapped NCJT as described above. For example, all or some resource block(s) may be overlapped and transmitted between the first PDSCH and the second PDSCH. In this case, since interference may occur between PDSCHs, different scrambling (e.g., data scrambling) may be applied to each PDSCH to alleviate the interference.

As an example, a seed (i.e., an initial value) of a scrambling sequence of the PDSCH may be defined as in Equation 3 below. The scrambling sequence may be generated based on the seed generated according to Equation 3 and a specific sequence generator (e.g., a gold sequence generator having a length of 31).

$$c_{init} = n_{RNTI} \cdot 2^{15} + q \cdot 2^{14} + N_{ID}$$ [Equation 3]

In Equation 3, c_init may denote the seed, n_RNTI may denote an RNTI related to transmission of a PDSCH, q may denote an index of a codeword related to transmission of a PDSCH, and N_ID may denote identification information related to scrambling of the PDSCH. The BS may configure the information on the N_ID for the terminal through higher layer signaling related to PDSCH configuration (e.g., PDSCH-related Config transmitted through RRC signaling). As an example, the terminal may be configured to receive one PDSCH configuration per bandwidth part (BWP).

When the same q and n_RNTI are configured for the first PDSCH and the second PDSCH, it may be necessary to distinguish between N_IDs to generate (or configure) different scrambling sequences. That is, when other conditions are the same, the seed values of the scrambling sequences may be distinguished by configuring the N_ID to be different, and as a result, the scrambling sequences may be generated to be different. For example, when the first PDSCH and the second PDSCH are transmitted in the same BWP, it may be necessary to configure different N_IDs to distinguish between the scrambling sequences. If the same N_ID is configured for the first PDSCH and the second PDSCH and other conditions are the same, the scrambling sequence of the first PDSCH and the scrambling sequence of the second PDSCH cannot be distinguished by the terminal and/or the BS.

In consideration of the aforementioned contents, the present disclosure proposes a method of configuring a plurality of identification information related to scrambling of a PDSCH in one PDSCH configuration (e.g., PDSCH configuration information element, etc.). For convenience of description, in this disclosure, the identification information is referred to as N_ID with reference to Equation 3, but is not limited thereto and may be changed to and interpreted by another expression.

As an example, when a plurality of N_IDs are configured, each i-th N_ID may be used as information for generating a scrambling sequence of the i-th PDSCH. That is, when a first N_ID and a second N_ID are configured, the first N_ID may be related to generation of a scrambling sequence of a first PDSCH, and the second N_ID may be related to generation of a scrambling sequence of a second PDSCH.

The terminal may be unclear which N_ID value is to be used for (or to be applied to) the received PDSCH. In this case, a method of configuring or defining for UE to recognize information (e.g., an index) of the PDSCH received by the UE based on DCI including scheduling information of the corresponding PDSCH may be considered. For example, the UE may be configured to recognize information (e.g., index) of the PDSCH depending on which control resource (e.g., a control resource set (CORESET)) the DCI for scheduling the PDSCH is related to or through which QCL reference signal (set) the DCI is received. And/or, information indicating an N_ID applied to scrambling of the corresponding PDSCH may be included in the DCI.

For example, if a CORESET related to the first TP/TRP and a CORESET related to the second TP/TRP are different from each other, the BS may configure the CORESET related to the first TP/TRP as a first CORESET group for the UE and may configure the CORESET related to the second TP/TRP as a second CORESET group, among one or more CORESETs belonging to the same BWP.

The CORESET group may mean that one or more CORESETs are classified into one or more groups. That is, the CORESET group may include one or more CORESETs. The CORESET group may also be replaced with other expressions such as a CORESET pool. Specific identification information (e.g., index) may be configured and/or defined for the configuration and/or indication of such a CORESET group. The specific identification information may be configured through higher layer signaling or the like, and may be referred to as a CORESET group index or a CORESET pool index, for example.

In addition, as an example, location and/or topographic characteristics may be different for each TP/TRP. When the UE receives DCI transmitted by different TP/TRP, the UE may estimate (and/or receive) the PDCCH using different spatial related information (e.g., QCL parameter, QCL type, QCL related reference signal), and perform decoding on the corresponding PDCCH. Here, the spatial related information may be configured and/or indicated for each CORESET. Therefore, it may be desirable to configure and/or indicate different CORESETs (or CORESET groups/pools) for each TP/TRP.

As described above, in a case in which the first CORESET group is configured for the first TP/TRP, when the terminal receives the DCI through a CORESET belonging to the first CORESET group, the corresponding terminal may perform descrambling on the PDSCH scheduled by the DCI using the first N_ID.

Meanwhile, in a case in which the second CRESET group is configured for the second TP/TRP as described above, when the terminal receives the DCI through a CORESET belonging to the second CORESET group, the corresponding terminal may perform descrambling on the PDSCH scheduled by the DCI using the second N_ID.

In addition, as described above, when CORESETs are distinguished by TP/TRPs, a plurality of CORESETs may be required for joint transmission. Accordingly, it may be limited to use multiple CORESETs for other purposes. In order to configure two TP/TRPs to share the same CORESET, a method in which the BS indicates two spatial-related information (e.g., QCL parameter, QCL type, QCL-related reference signal) in one CORESET for the UE may also be considered. In this case, the terminal may determine an N_ID according to the spatial-related information used for DCI detection in the CORESET. That is, when the terminal detects DCI based on i-th spatial-related information (e.g., i-th QCL parameter, i-th QCL type, QCL-related i-th reference signal, etc.), the corresponding terminal may descramble the PDSCH scheduled by the DCI using the i-th N_ID.

In addition, instead of configuring a plurality of N_IDs (e.g., first N_ID, second N_ID, etc.) in one PDSCH configuration, a method in which the BS configures multiple PDSCH configurations to the terminal in one BWP will also be considered. For example, a first PDSCH configuration and a second PDSCH configuration may be defined in the BWP, and a plurality of parameters including scrambling identification information (e.g., N_ID) may be independently configured in each PDSCH configuration. Even in this case, the aforementioned proposed method may be extended and applied. As an example, the terminal may receive configuration information in which each PDSCH configuration is associated (or connected) with each CORESET group/pool, from the BS, and the corresponding terminal may perform decoding using the PDSCH configuration associated with the CORESET group/pool in which the DCI was received. And/or, the terminal may receive configuration information associated with each PDSCH configuration for each spatial-related information (e.g., QCL parameter, QCL type, QCL-related reference signal (set), etc.) used for DCI detection from the BS, and the corresponding terminal may perform decoding on the PDSCH using the PDSCH configuration associated with the spatial-related information used for DCI detection.

In addition, as described above, when two scrambling identification information (e.g., N_ID) are not configured to be different for generation of a scrambling sequence of a PDSCH, scrambling sequences for two PDSCHs may be generated (or configured) to be different through a method as in the following example. For example, a method in which the first PDSCH transmitted by the first TP/TRP is configured to use physical cell identification information (e.g., Pcell ID), and the second PDSCH transmitted by the second TP/TRP is configured to use a configured N_ID value may be considered. Here, the used N_ID value may be configured or defined to have a value different from the physical cell identification information. Even in this case, as described above, depending on which CORESET (or CORESET group/pool) or spatial related information was used by the terminal to receive the DCI including information for scheduling the PDSCH, the corresponding terminal may determine which of physical cell identification information or an N_ID value is to be used as information for generating a scrambling sequence of the PDSCH. Alternatively, the DCI may include (indication) information indicating information related to (or to be related to) generation of the scrambling sequence of the PDSCH among physical cell identification information or N_ID value.

The method and/or operation described in this embodiment are described based on scrambling related to downlink data, but may also be extend and applied to scrambling of an uplink channel (e.g., PUSCH, PUCCH) and/or a downlink control channel (e.g., PDCCH).

Through the method and/or operation described in the present embodiment, even when the terminal receives some or all of PDSCHs from a plurality of TP/TRPs in an overlapping manner, generated scrambling sequences may be distinguished from each other and a descrambling operation for corresponding PDSCHs may be clearly distinguishably performed. In addition, as the transmission and reception of the PDSCH is performed based on the classification of the CORESET group/pool, the transmission and reception of the PDSCH may be efficiently performed even in joint transmission based on the TP/TRP(s) of the BS(s) without uncertainty of the terminal operation.

Second Embodiment

In the case of a single DCI based joint transmission, a plurality of TP/TRPs may transmit one PDSCH through different layers. For example, an i-th TP/TRP may transmit the PDSCH to the terminal through an i-th layer, and one PDSCH may be transmitted through a total of i layers.

In this embodiment, for convenience of description, in a single DCI based joint transmission, a layer in which a first TP/TRP transmits a PDSCH is referred to as a first layer, and a layer in which a second TP/TRP transmits a PDSCH is referred to as a second layer. In the present embodiment, transmission of the PDSCH through two layers is described, but the method described below may be extended and applied to transmission through a plurality of layers. As described above, the first TP/TRP and the second TP/TRP may be included (or implemented) in one BS or may be included in different BSs, respectively. In the present disclosure, the PDSCH is a channel for data transmission and may be replaced with an expression such as downlink data and/or a codeword.

The present disclosure proposes a method of configuring (or applying) different scrambling related parameters for each layer. For convenience of description, in the present disclosure, a scrambling-related parameter is referred to as an N-ID with reference to Equation 3, but is not limited thereto and may be extended to and interpreted as other parameters.

For example, different PDSCH scrambling may be applied between the first layer and the second layer. Similar to the first embodiment as described above, a plurality of N_IDs may be configured in one PDSCH configuration, and scrambling based on an i-th N_ID among a plurality of N_IDs may be applied to a layer (e.g., i-th layer) used (or transmitted) by an i-th TP/TRP. Alternatively, one N_ID may be configured in one PDSCH configuration, but scrambling based on physical cell identification information (e.g., Pcell ID) may be applied to a first layer used by the first TP/TRP and scrambling based on N_ID may be applied to a second layer used by a second TP/TRP.

The terminal needs to classify a layer group (or layer pool) and may determine a value for each group to descramble the corresponding PDSCH through a method as shown in the following example. For example, a demodulation reference signal (DMRS) port and a layer are mapped in a one-to-one manner, and a DMRS port group transmitted by each TP/TRP may be indicated to the UE. Here, the DMRS port group may also be referred to as a code division multiplex (CDM) group or the like. When a receiving DMRS port belongs to an i-th DMRS port group, the terminal may be configured to perform descrambling using an i-th N_ID. Alternatively, if the receiving DMRS port belongs to (or is related to) a first DMRS port group, the terminal may be configured to descramble the PDSCH using physical cell identification information, and if the receiving DMRS port belongs to a second DMRS port group, the terminal may be configured to descramble the PDSCH using the N_ID.

In addition, a location and/or topographic characteristics may be different for each TP/TRP. When TP/TRPs having different characteristics transmit different layers, each layer of TP/TRP may have different channel characteristics. As an example, spatial-related information (e.g., QCL parameter, QCL type, QCL-related reference signal, etc.) between layers may be different. Therefore, when implementing the terminal, it may be desirable to design an reception (Rx) filter for each layer used by each TP/TRP. When the terminal applies an independent reception filter to a reception layer for each TP/TRP, interference may exist between a first layer of the first TP/TRP and a second layer of the second TP/TRP through the reception filter. In this case, the interference may be reduced or eliminated according to the user of a scrambling method for each layer group described above.

The method and/or operation described in this embodiment is described based on scrambling related to downlink data, but may also be extended and applied to scrambling of an uplink channel (e.g., PUSCH, PUCCH) and/or a downlink control channel (e.g., PDCCH).

Even when the terminal receives the PDSCH from a plurality of TP/TRPs through a plurality of layers through the method and/or operation described in this embodiment, generation of a scrambling sequence is classified and a descrambling operation for the corresponding PDSCH may be clearly distinguishably performed.

In addition, as PDSCH transmission/reception is performed based on layer group/pool classification, the PDSCH transmission/reception may be efficiently performed without uncertainty of a terminal operation even in joint transmission based on TP/TRP(s) of the BS(s).

Third Embodiment

In this embodiment, a method of scrambling a downlink control channel (e.g., PDCCH) is proposed. For PDCCH scrambling, a parameter for generating a scrambling sequence of a PDCCH and/or a parameter for generating a DMRS sequence of a PDCCH may be configured for each CORESET. As an example, the corresponding parameter may include N_ID as described in Equation 3 above.

In a case in which the CORESET of the PDCCH transmitted by each TP/TRP is separated (or classified) in multiple DCI-based joint transmission, it may be possible for each TP/TRP to use different parameters. In this embodiment, for convenience of explanation, in joint transmission based on a single DCI, a PDCCH transmitted by the first TP/TRP is referred to as a first PDCCH, and a PDCCH transmitted by the second TP/TRP is referred to as a second PDCCH. For example, the first PDCCH and the second PDCCH may be transmitted through a first CORESET and a second CORESET, respectively, and even when the first PDCCH and the second PDCCH are transmitted (in collision) together in the same resource (e.g., a resource element (RE), etc.), interference may be randomized through different scrambling methods. In this case, the UE may receive a quasi-orthogonal DMRS based on another DMRS sequence.

In multi-DCI-based joint transmission, when the PDCCHs transmitted through each TP/TRP shares one CORESET, spatial related information (e.g., QCL-related reference signal (set), etc.) for each TP/TRP needs to be configured for the one CORESET separately. Here, sharing one CORESET by PDCCHs transmitted through each TP/TRP may mean that a plurality of TP/TRPs transmit PDCCHs in the same control resource region. In this case, as an example, two N_IDs may be configured and/or indicated for one CORESET, and the terminal may determine (or recognize) which of two N_IDs is to be applied for descrambling according to which of the first TP/TRP or the second TP/TRP the spatial related information applied to reception (or detection) of the DCI is for. Alternatively, as another example, when one N_ID is configured and/or indicated for one CORESET, the terminal may determine (or recognize) which of physical cell identification information or N_ID is to be applied according to which of the first TP/TRP or the second TP/TRP the spatial related information applied to reception (or detection) of the DCI is for.

In addition, when a search space (SS) of each PDCCH is separately configured for one CORESET, scrambling identification information (e.g., N_ID) may be associated (or linked) with each search region. For example, when (i) the first TP/TRP and the second TP/TRP share one CORESET, (ii) the first TP/TRP is configured to use a first search space, and the second TP/TRP is configured to use a second search space, in the corresponding CORESET, it may be configured (or defined) such that a first N_ID is used in the first search space and a second N_ID is used in the second search space. In this case, the first N_ID and the second N_ID may be previously set (through higher layer signaling, etc.) to be related to the CORESET. That is, for the scrambling operation of the BS and the descrambling operation of the terminal, the first N_ID may be used in the first search space and the second N_ID may be used in the second search space. Alternatively, in a case in which only one N_ID is configured to be related to the CORESET, it may be configured (or defined) such that physical cell identification information is used in the first search space and N_ID is used in the second search space. That is, for the scrambling operation of the BS and the descrambling operation of the terminal, physical cell identification information may be used in the first search space and N_ID may be used in the second search space.

The method proposed in this embodiment has been described based on the generation of the scrambling sequence of the PDCCH, but may be extended and applied to the generation of a DMRS sequence of the PDCCH. For example, in relation to the generation of the DMRS sequence for the PDCCH, parameter(s) (e.g., N_ID, physical cell identification information, etc.) may be applied based on the proposed method described above.

Through the method and/or operation described in the present embodiment, even when the terminal receives a plurality of PDCCHs from a plurality of TP/TRPs, the generation of a scrambling sequence and/or a DMRS sequence may be distinguished and the descrambling operation for the corresponding PDCCH may be clearly classified and performed. In addition, as the transmission/reception of a plurality of PDCCHs is performed by distinguishing between parameters (e.g., N_ID, physical cell identification information, etc. related to sequence generation), transmission and reception of the PDCCH may be efficiently performed without uncertainty even in joint transmission of the BS(s) based on TP/TRP(s).

In the embodiments of the present disclosure described above, a method of configuring a plurality of scrambling identification information (e.g., N_ID, etc.) for one PDSCH configuration and/or one CORESET has been proposed. In addition, a method of defining a rule to configure one scrambling identification information for one PDSCH configuration and/or one CORESET and to generate a plurality of identification information based on the corresponding scrambling identification information. For example, when N_ID is configured for a specific PDSCH configuration and/or a specific CORESET, the first N_ID and the second N_ID may be determined (or calculated) based on an equation using the N_ID as an input value. That is, the terminal receives a configuration including only one N_ID information from the BS, but the terminal may generate (or determine) a plurality of N_IDs based on the received N_ID information and a predefined rule. For example, the first N_ID may be determined as received N_ID information, and the second N_ID may be determined as f (N_ID, physical cell identification information). Here, the function f( ) may be a function that outputs the sum of N_ID and physical cell identification information or a function that outputs a determined value through various bit operations (e.g., exclusive or, or, and, etc.).

FIG. 9 shows an example of an operation flowchart of a terminal receiving data in a wireless communication system to which the method proposed in the present disclosure may be applied. FIG. 9 is merely for convenience of description and does not limit the scope of the present disclosure.

The terminal may receive BWP configuration information related to the bandwidth part (BWP) (S905). For example, the BWP configuration information may include configuration for one or more bandwidth parts. The terminal may receive information for activating a specific bandwidth part among one or more bandwidth parts based on the BWP configuration information (S910). Here, the activated specific bandwidth part may be referred to as an active downlink BWP (active DL BWP). The information may be delivered using higher layer signaling (e.g., RRC signaling), MAC-CE-based signaling, and/or downlink control information.

For example, the operation of receiving the BWP configuration information and information for activating the specific bandwidth part by the terminal (for example, 1010 and/or 1020 of FIGS. 12 to 17) in steps S905 and S910 described above may be implemented by the device of FIGS. 12 to 17 which will be described below. For example, referring to FIG. 12, one or more processors 102 may control one or more transceivers 106 and/or one or more memories 104 to receive the BWP configuration information and information for activating the specific bandwidth part. The one or more transceivers 106 may receive the BWP configuration information and information for activating the specific bandwidth part.

The terminal may receive configuration information related to a control resource of a physical control channel (e.g., PDCCH) based on the activated specific bandwidth part (S915). Here, one or more control resources included in the configuration information may be configured as a first control resource group or a second control resource group, respectively. For example, as described above in the present disclosure, the terminal may receive CORESET-related configuration information through higher layer signaling, etc., and each of the CORESETs included in the corresponding configuration information may be associated with information indicating a first CORESET group or a second CORESET group. That is, the control resource may be the control resource set (CORESET) described above, and the control resource group may be the CORESET group/pool described above. For example, the first CORESET group or the second CORESET group may be identified using different index values of specific information, and the specific information may also be configured through higher layer signaling or the like.

For example, the operation in which the terminal (e.g., 1010 and/or 1020 of FIGS. 12 to 17) receives the configuration information from the BS (e.g., 1010 and/or 1020 of FIGS. 12 to 17) in step S915 described above may be implemented by a device of FIGS. 12 to 17 to be described below. For example, referring to FIG. 12, one or more processors 102 may control one or more transceivers 106 and/or one or more memories 104 to receive the configuration information, and one or more transceivers 106 may receive the configuration information.

The terminal may receive a first physical control channel and a second physical control channel based on the configuration information (S920). For example, as described above in the present disclosure, the terminal may receive a first PDCCH and/or a second PDCCH in a corresponding resource by using the control resource information included in the CORESET-related configuration information. Here, each of the first physical control channel and the second physical control channel may includes (or carry) information for scheduling different physical data channels.

For example, the operation in which a terminal (e.g., 1010 and/or 1020 of FIGS. 12 to 17) receives a physical control channel from a BS (e.g., 1010 and/or 1020 of FIGS. 12 to 17) in step S920 described above may be implemented by the device of FIGS. 12 to 17 to be described below. For example, referring to FIG. 12, one or more processors 102 may control one or more transceivers 106 and/or one or more memories 104 to receive a physical control channel, and one or more transceivers 106 may receive a physical control channel.

The terminal may receive a first physical data channel (e.g., a first PDSCH) based on the first control resource group associated with the control resource in which the first physical control channel is received, and may receive a second physical control channel (e.g., a second PDSCH) based on the second control resource group associated with the control resource in which the second physical control channel is received (S925). For example, as described above in this disclosure, the terminal may receive the first PDSCH based on the first CORESET group associated with the DCI reception (or detection) of the first PDCCH, and may receive the second PDSCH based on the second CORESET group associated with the DCI reception (or detection) of the second PDCCH. In addition, as an example, as in the joint transmission (e.g., NCJT, etc.) described above, the first PDSCH and the second PDSCH may be received in partially overlapped resource regions (e.g., RB) or entirely overlapped resource regions. In this case, the first PDSCH and the second PDSCH may be received in the same time domain (e.g., slot, symbol).

For example, the operation in which the terminal (e.g., 1010 and/or 1020 of FIGS. 12 to 17) receives the physical data channel from the BS (e.g., 1010 and/or 1020 of FIGS. 12 to 17) in step S925 described above may be implemented by the device of FIGS. 12 to 17 to be described below. For example, referring to FIG. 12, one or more processors 102 may control one or more transceivers 106 and/or one or more memories 104 to receive a physical data channel, and one or more transceivers 106 may receive a physical data channel.

In addition, the terminal may receive data channel configuration information (e.g., PDSCH configuration, PDSCH Config Information Element (IE), etc.) for the first physical data channel and the second physical data channel. The data channel configuration information may include parameter information for scrambling the first physical data channel and the second physical data channel. For example, as described above in the present disclosure, the parameter information may include first scrambling identification information (e.g., first N_ID) for the first physical data channel and second scrambling identification information for the second physical data channel. (e.g., second N_ID). In this case, the first scrambling identification information may be associated with the first control resource group, and the second scrambling identification information may be associated with the second control resource group. For example, each of the first scrambling identification information and the second scrambling identification information may be configured and/or defined to be associated with different indexes (e.g., higher layer signaling information) indicating a control resource group. The terminal may descramble the first physical data channel and the second physical data channel based on the parameter information.

In addition, spatial-related information for reception of the physical control channel may be configured for each control resource. Here, the spatial-related information may include at least one of a QCL application-related parameter, QCL type information, and QCL-related reference signal information. For example, as described above in the present disclosure, spatial-related information (e.g., QCL parameter, QCL type, QCL-related reference signal (set), etc.) related to DCI reception and/or scrambling of PDSCH may be configured for each CORESET.

FIG. 10 shows an example of an operation flowchart of a BS transmitting data in a wireless communication system to which the method proposed in the present disclosure may be applied. FIG. 10 is merely for convenience of description and does not limit the scope of the present disclosure.

The BS may transmit BWP configuration information related to the BWP part (BWP) (S1005). For example, the BWP configuration information may include configuration for one or more BWP parts. The BS may transmit information for activating a specific BWP part among one or more BWP parts based on the BWP configuration information (S1010). Here, the activated specific BWP part may be referred to as an active downlink BWP (active DL BWP). The information may be delivered using higher layer signaling (e.g., RRC signaling), MAC-CE-based signaling, and/or downlink control information.

For example, the operation in which the BS (e.g., 1010 and/or 1020 of FIGS. 12 to 17) transmits the BWP configuration information and information for activating the specific BWP part in steps S1005 and S1010 described above may be implemented by the device of FIGS. 12 to 17 to be described below. For example, referring to FIG. 12, one or more processors 102 may control one or more transceivers 106 and/or one or more memories 104 to transmit the BWP configuration information and the information for activating the specific BWP part, and the one or more transceivers 106 may transmit the BWP configuration information and information for activating the specific BWP part.

The BS may transmit configuration information related to control resources of a physical control channel (e.g., PDCCH) (S1015). Here, one or more control resources included in the configuration information may be configured as a first control resource group or a second control resource group, respectively. For example, as described above in the present disclosure, the BS may transmit CORESET-related configuration information through higher layer signaling, etc., and each of the CORESETs included in the corresponding configuration information may be related to information indicating the first CORESET group or the second CORESET group. That is, the control resource may be the control resource set (CORESET) described above, and the control resource group may be the CORESET group/pool described above. For example, the first CORESET group or the second CORESET group may be identified using different index values of specific information, and the specific information may be configured through higher layer signaling or the like.

For example, the operation in which the BS (e.g., 1010 and/or 1020 of FIGS. 12 to 17) transmits the configuration information to the terminal (e.g., 1010 and/or 1020 of FIGS. 12 to 17) in step S1015 described above may be implemented by the device of FIGS. 12 to 17 to be described below. For example, referring to FIG. 12, one or more processors 102 may control one or more transceivers 106 and/or one or more memories 104 to transmit the configuration information, and one or more transceivers 106 may transmit the configuration information.

The BS may transmit a first physical control channel and a second physical control channel based on the configuration information (S1020). For example, as described above in this disclosure, the BS may transmit a first PDCCH and/or a second PDCCH in the corresponding resource by using the control resource information included in the CORESET-related configuration information. Here, the first physical control channel and the second physical control channel may each include (or carry) information for scheduling different physical data channels.

For example, the operation in which the BS (e.g., 1010 and/or 1020 of FIGS. 12 to 17) transmits a physical control channel to the terminal (e.g., 1010 and/or 1020 of FIGS. 12 to 17) in step S1020 may be implemented by the device of FIGS. 12 to 17 to be described below. For example, referring to FIG. 12, one or more processors 102 may control one or more transceivers 106 and/or one or more memories 104 to transmit a physical control channel, and one or more transceivers 106 may transmit a physical control channel.

The BS may transmit the first physical data channel (e.g., a first PDSCH) based on the first control resource group associated with the control resource in which the first physical control channel is received, and may transmit the second physical control channel (e.g., a second PDSCH) based on the second control resource group associated with the received control resource in which the second physical data channel is received (S1025). For example, as described above in the present disclosure, the BS may transmit a first PDSCH based on a first CORESET group associated with DCI reception (or detection) of a first PDCCH, and may transmit a second PDSCH based on a second CORESET group associated with DCI reception (or detection) of a second PDCCH. In addition, as an example, as in the joint transmission (e.g., NCJT, etc.) described above, the first PDSCH and the second PDSCH may be transmitted in a partially overlapped resource region (e.g., RB, etc.) or an entirely overlapped resource region. In this case, the first PDSCH and the second PDSCH may be transmitted in the same time domain (e.g., slot, symbol).

For example, the operation in which the BS (e.g., 1010 and/or 1020 of FIGS. 12 to 17) transmits a physical data channel to the terminal (e.g., 1010 and/or 1020 of FIGS. 12 to 17) in step S1025 described above may be implemented by the device of FIGS. 12 to 17 to be described below. For example, referring to FIG. 12, one or more processors 102 may control one or more transceivers 106 and/or one or more memories 104 to transmit a physical data channel, and one or more transceivers 106 may transmit a physical data channel.

In addition, the BS may transmit data channel configuration information (e.g., PDSCH configuration, PDSCH Config Information Element (IE), etc.) for the first physical data channel and the second physical data channel. The data channel configuration information may include parameter information for scrambling the first physical data channel and the second physical data channel. For example, as described above in the present disclosure, the parameter information may include first scrambling identification information (e.g., first N_ID) for the first physical data channel and second scrambling identification information (e.g., second N_ID) for the second physical data channel. In this case, the first scrambling identification information may be related to the first control resource group, and the second scrambling identification information may be related to the second control resource group. The BS may scramble the first physical data channel and the second physical data channel based on the parameter information (e.g., refer to Equation 3 above). For example, each of the first scrambling identification information and the second scrambling identification information may be configured and/or defined to be related to different indexes (e.g., higher layer signaling information) indicating a control resource group. Also, the terminal may descramble the first physical data channel and the second physical data channel based on the parameter information.

In addition, spatial-related information for reception of the physical control channel may be configured for each control resource. Here, the spatial-related information may include at least one of a QCL application-related parameter, QCL type information, and QCL-related reference signal information. For example, as described above in the present disclosure, the spatial-related information (e.g., QCL parameter, QCL type, QCL-related reference signal (set), etc.) related to DCI reception and/or scrambling of PDSCH may be configured for each CORESET.

As mentioned above, the signaling and operation between the BS and/or the terminal (e.g., FIGS. 9 and 10, etc.) may be implemented by the device (e.g., FIGS. 12 to 17) to be described below. For example, the BS may correspond to a first wireless device, and the terminal may correspond to a second wireless device, and vice versa may be considered in some cases.

For example, the aforementioned signaling and operation between the BS and/or the terminal (e.g., FIGS. 9 and 10, etc.) may be processed by one or more processors (e.g., 102 and 202) of FIGS. 12 to 17, and the aforementioned signaling and operation between the BS and/or the terminal (e.g., FIGS. 9 and 10, etc.) may be stored in the form of an instruction/program (e.g., instruction, executable code) for driving at least one processor (e.g., 102 and 202) of FIGS. 12 to 17 in one or more memories (e.g., 104 and 204) of FIG. 12.

Communication System Applied to the Present Disclosure

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 11 illustrates a communication system applied to the present disclosure.

Referring to FIG. 11, a communication system applied to the present disclosure includes wireless devices, BSs (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 1010a, vehicles 1010b-1 and 1010b-2, an eXtended Reality (XR) device 1010c, a hand-held device 1010d, a home appliance 1010e, an Internet of Things (IoT) device 1010f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 1010a may operate as a BS/network node with respect to other wireless devices.

The wireless devices 1010a to 1010f may be connected to the network 300 via the BSs 1020. An AI technology may be applied to the wireless devices 1010a to 1010f and the wireless devices 1010a to 1010f may be connected to the AI server 400 via the network 300. The network 300 may be configured using a 3G network, a 4G (e.g., LTE) network, or a 5G (e.g., NR) network. Although the wireless devices 1010a to 1010f may communicate with each other through the BSs 1020/network 300, the wireless devices 1010a to 1010f may perform direct communication (e.g., sidelink communication) with each other without passing through the BSs/network. For example, the vehicles 1010b-1 and 1010b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 1010a to 1010f.

Wireless communication/connections 150a, 150b, or 150c may be established between the wireless devices 1010a to 1010f/BS 1020, or BS 1020/BS 1020. Herein, the wireless communication/connections may be established through various RATs (e.g., 5G NR) such as uplink/downlink communication 150a, sidelink communication 150b (or, D2D communication), or inter BS communication (e.g. Relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Devices Applicable to the Present Disclosure

FIG. 12 illustrates wireless devices applicable to the present disclosure.

Referring to FIG. 12, a first wireless device 1010 and a second wireless device 1020 may transmit radio signals through a variety of RATs (e.g., LTE and NR). Herein, {the first wireless device 1010 and the second wireless device 1020} may correspond to {the wireless device 1010x and the BS 1020} and/or {the wireless device 1010x and the wireless device 1010x} of FIG. 11.

The first wireless device 1010 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 1020 may include at least one processor 202 and at least one memory 204 and additionally further include at least one transceiver 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 206 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 1010 and 1020 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. From RF band signals into baseband signals in order to process received user data, control information, radio signals/channels, etc. Using the one or more processors 102 and 202. The one or more transceivers 106 and 206 may convert the user data, control information, radio signals/channels, etc. Processed using the one or more processors 102 and 202 from the base band signals into the RF band signals. To this end, the one or more transceivers 106 and 206 may include (analog) oscillators and/or filters.

Signal Processing Circuit Example to which Present Disclosure is Applied

FIG. 13 illustrates a signal processing circuit for a transmit signal.

Referring to FIG. 13, a signal processing circuit 2000 may include a scrambler 2010, a modulator 2020, a layer mapper 2030, a precoder 2040, a resource mapper 2050, and a signal generator 2060. Although not limited thereto, an operation/function of FIG. 13 may be performed by the processors 102 and 202 and/or the transceivers 106 and 206 of FIG. 12. Hardware elements of FIG. 13 may be implemented in the processors 102 and 202 and/or the transceivers 106 and 206 of FIG. 12. For example, blocks 2010 to 2060 may be implemented in the processors 102 and 202 of FIG. 12. Further, blocks 2010 to 2050 may be implemented in the processors 102 and 202 of FIG. 12 and the block 2060 may be implemented in the transceivers 106 and 206 of FIG. 12.

A codeword may be transformed into a radio signal via the signal processing circuit 1000 of FIG. 13. Here, the codeword is an encoded bit sequence of an information block. The information block may include transport blocks (e.g., a UL-SCH transport block and a DL-SCH transport block). The radio signal may be transmitted through various physical channels (e.g., PUSCH and PDSCH).

Specifically, the codeword may be transformed into a bit sequence scrambled by the scrambler 2010. A scramble sequence used for scrambling may be generated based on an initialization value and the initialization value may include ID information of a wireless device. The scrambled bit sequence may be modulated into a modulated symbol sequence by the modulator 2020. A modulation scheme may include pi/2-BPSK (pi/2-Binary Phase Shift Keying), m-PSK (m-Phase Shift Keying), m-QAM (m-Quadrature Amplitude Modulation), etc. A complex modulated symbol sequence may be mapped to one or more transport layers by the layer mapper 2030. Modulated symbols of each transport layer may be mapped to a corresponding antenna port(s) by the precoder 2040 (precoding). Output z of the precoder 2040 may be obtained by multiplying output y of the layer mapper 2030 by precoding matrix W of N*M. Here, N represents the number of antenna ports and M represents the number of transport layers. Here, the precoder 2040 may perform precoding after performing transform precoding (e.g., DFT transform) for complex modulated symbols. Further, the precoder 2040 may perform the precoding without performing the transform precoding.

The resource mapper 2050 may map the modulated symbols of each antenna port to a time-frequency resource. The time-frequency resource may include a plurality of symbols (e.g., CP-OFDMA symbol and DFT-s-OFDMA symbol) in a time domain and include a plurality of subcarriers in a frequency domain. The signal generator 2060 may generate the radio signal from the mapped modulated symbols and the generated radio signal may be transmitted to another device through each antenna. To this end, the signal generator 2060 may include an Inverse Fast Fourier Transform (IFFT) module, a Cyclic Prefix (CP) inserter, a Digital-to-Analog Converter (DAC), a frequency uplink converter, and the like.

A signal processing process for a receive signal in the wireless device may be configured in the reverse of the signal processing process (2010 to 2060) of FIG. 13. For example, the wireless device (e.g., 100 or 200 of FIG. 12) may receive the radio signal from the outside through the antenna port/transceiver. The received radio signal may be transformed into a baseband signal through a signal reconstructer. To this end, the signal reconstructer may include a frequency downlink converter, an analog-to-digital converter (ADC), a CP remover, and a Fast Fourier Transform (FFT) module. Thereafter, the baseband signal may be reconstructed into the codeword through a resource de-mapper process, a postcoding process, a demodulation process, and a de-scrambling process. The codeword may be reconstructed into an original information block via decoding. Accordingly, a signal processing circuit (not illustrated)

for the receive signal may include a signal reconstructer, a resource demapper, a postcoder, a demodulator, a descrambler, and a decoder.

Example of a Wireless Device Applied to the Present Disclosure

FIG. 14 illustrates another example of a wireless device applied to the present disclosure. The wireless device may be implemented in various forms according to a use-case/service (refer to FIG. 11).

Referring to FIG. 14, wireless devices 1010 and 1020 may correspond to the wireless devices 1010 and 1020 of FIG. 12 and may be configured by various elements, components, units/portions, and/or modules. For example, each of the wireless devices 1010 and 1020 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 104 of FIG. 12. For example, the transceiver(s) 114 may include the one or more transceivers 106 and 106 and/or the one or more antennas 108 and 108 of FIG. 12. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110).

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (1010a of FIG. 11), the vehicles (1010b-1 and 1010b-2 of FIG. 11), the XR device (1010c of FIG. 11), the hand-held device (1010d of FIG. 11), the home appliance (1010e of FIG. 11), the IoT device (1010f of FIG. 11), a digital broadcast terminal, a hologram device, a public safety device, an MTC device, a medicine device, a fintech device (or a finance device), a security device, a climate/environment device, the AI server/device (400 of FIG. 11), the BSs (1020 of FIG. 11), a network node, etc. The wireless device may be used in a mobile or fixed place according to a use-example/service.

In FIG. 14, the entirety of the various elements, components, units/portions, and/or modules in the wireless devices 1010 and 1020 may be connected to each other through a wired interface or at least a part thereof may be wirelessly connected through the communication unit 110. For example, in each of the wireless devices 1010 and 1020, the control unit 120 and the communication unit 110 may be connected by wire and the control unit 120 and first units (e.g., 130 and 140) may be wirelessly connected through the communication unit 110. Each element, component, unit/portion, and/or module within the wireless devices 1010 and 1020 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an implementation example of FIG. 14 will be described in detail with reference to the accompanying drawings.

Portable Device Example to which Present Disclosure is Applied

FIG. 15 illustrates a portable device applied to the present disclosure. The portable device may include a smart phone, a smart pad, a wearable device (e.g., a smart watch, a smart glass), and a portable computer (e.g., a notebook, etc.). The portable device may be referred to as a Mobile Station (MS), a user terminal (UT), a Mobile Subscriber Station (MSS), a Subscriber Station (SS), an Advanced Mobile Station (AMS), or a Wireless terminal (WT).

Referring to FIG. 15, a portable device 1010 may include an antenna unit 108, a communication unit 110, a control unit 120, a memory unit 130, a power supply unit 140a, an interface unit 140b, and an input/output unit 140c. The antenna unit 108 may be configured as a part of the communication unit 110. The blocks 110 to 130/140a to 140c correspond to the blocks 110 to 130/140 of FIG. 14, respectively.

The communication unit 110 may transmit/receive a signal (e.g., data, a control signal, etc.) to/from another wireless device and eNBs. The control unit 120 may perform various operations by controlling components of the portable device 1010. The control unit 120 may include an Application Processor (AP). The memory unit 130 may store data/parameters/programs/codes/instructions required for driving the portable device 1010. Further, the memory unit 130 may store input/output data/information, etc. The power supply unit 140a may supply power to the portable device 1010 and include a wired/wireless charging circuit, a battery, and the like. The interface unit 140b may support a connection between the portable device 1010 and another external device. The interface unit 140b may include various ports (e.g., an audio input/output port, a video input/output port) for the connection with the external device. The input/output unit 140c may receive or output a video information/signal, an audio information/signal, data, and/or information input from a user. The input/output unit 140c may include a camera, a microphone, a user input unit, a display unit 140d, a speaker, and/or a haptic module.

As one example, in the case of data communication, the input/output unit 140c may acquire information/signal (e.g., touch, text, voice, image, and video) input from the user and the acquired information/signal may be stored in the memory unit 130. The communication unit 110 may transform the information/signal stored in the memory into the radio signal and directly transmit the radio signal to another wireless device or transmit the radio signal to the eNB. Further, the communication unit 110 may receive the radio signal from another wireless device or eNB and then reconstruct the received radio signal into original information/signal. The reconstructed information/signal may be stored in the memory unit 130 and then output in various forms (e.g., text, voice, image, video, haptic) through the input/output unit 140c.

Example of AI Device Applied to the Present Disclosure

FIG. 16 illustrates an example of an AI device applied to the present disclosure. The AI device may be implemented as a fixed device or mobile device, such as TV, a projector, a smartphone, PC, a notebook, a terminal for digital broadcasting, a tablet PC, a wearable device, a set-top box (STB), a radio, a washing machine, a refrigerator, a digital signage, a robot, and a vehicle.

Referring to FIG. 16, the AI device 1010 may include a communication unit 110, a control unit 120, a memory 130, a input/output unit 140a/140b, a learning processor 140c, and a sensing unit 140d. Blocks 110~130/140a~140d correspond to block 110~130/140 in FIG. 14, respectively.

The communication unit 110 may transmit and receive wired/wireless signals (e.g., sensor information, user input, learning models, control signals, etc.) to and from external devices such as another AI device (e.g., FIG. 11, 1010x, 1020 or 400) or the AI server (FIG. 11, 400) using wired/wireless communication technology. To this end, the communication unit 110 may transmit information in the memory unit 130 to an external device or transfer a signal received from the external device to the memory unit 130.

The control unit 120 may determine at least one executable operation of the AI device 1010 based on information determined or generated using a data analysis algorithm or a machine learning algorithm. In addition, the control unit 120 may control the components of the AI device 1010 to perform the determined operation. For example, the control unit 120 may request, search for, receive or utilize the data of the learning processor unit 140c or the memory unit 130, and control the components of the AI device 1010 to perform predicted operation or operation, which is determined to be desirable, of at least one executable operation. In addition, the control unit 120 may collect history information including operation of the AI device 1010 or users feedback on the operation and store the history information in the memory unit 130 or the learning processor unit 140c or transmit the history information to the AI server (FIG. 11, 400). The collected history information may be used to update a learning model.

The memory unit 130 may store data supporting various functions of the AI device 1010. For example, the memory unit 130 may store data obtained from the input unit 140a, data obtained from the communication unit 110, output data of the learning processor unit 140c, and data obtained from the sensing unit 140. In addition, the memory unit 130 may store control information and/or software code necessary to operate/execute the control unit 120.

The input unit 140a may acquire various types of data from the outside of the AI device 1010. For example, the input unit 140a may acquire learning data for model learning, input data, to which the learning model will be applied, etc. The input unit 140a may include a camera, a microphone and/or a user input unit. The output unit 140b may generate video, audio or tactile output. The output unit 140b may include a display, a speaker and/or a haptic module. The sensing unit 140 may obtain at least one of internal information of the AI device 1010, the surrounding environment information of the AI device 1010 and user information using various sensors. The sensing unit 140 may include a proximity sensor, an illumination sensor, an acceleration sensor, a magnetic sensor, a gyro sensor, an inertia sensor, a red green blue (RGB) sensor, an infrared (IR) sensor, a finger scan sensor, an ultrasonic sensor, an optical sensor, a microphone and/or a radar.

The learning processor unit 140c may train a model composed of an artificial neural network using training data. The learning processor unit 140c may perform AI processing along with the learning processor unit of the AI server (FIG. 11, 400). The learning processor unit 140c may process information received from an external device through the communication unit 110 and/or information stored in the memory unit 130. In addition, the output value of the learning processor unit 140c may be transmitted to the external device through the communication unit 110 and/or stored in the memory unit 130.

FIG. 17 illustrates an AI server to be applied to the present disclosure.

Referring to FIG. 17, the AI server, 400 in FIG. 11, may mean a device which is trained by an artificial neural network using a machine learning algorithm or which uses a trained artificial neural network. In this case, the AI server 400 is configured with a plurality of servers and may perform distributed processing and may be defined as a 5G network. In this case, the AI server 400 may be included as a partial configuration of the AI device, 1010 in FIG. 16, and may perform at least some of AI processing.

The AI server 400 may include a communication unit 410, a memory 430, a learning processor 440 and a processor 460. The communication unit 410 may transmit and receive data to and from an external device, such as the AI device, 1010 in FIG. 16. The memory 430 may include a model storage unit 431. The model storage unit 431 may store a model (or artificial neural network 431a) which is being trained or has been trained through the learning processor 440. The learning processor 440 may train the artificial neural network 431a using learning data. The learning model may be used in the state in which it has been mounted on the AI server 400 of the artificial neural network or may be mounted on an external device, such as the AI device, 1010 in FIG. 16, and used. The learning model may be implemented as hardware, software or a combination of hardware and software. If some of or the entire learning model is implemented as software, one or more instructions configuring the learning model may be stored in the memory 430. The processor 460 may deduce a result value of new input data using the learning model, and may generate a response or control command based on the deduced result value.

The AI server 400 and/or the AI device 1010 may be applied by being combined with the robot 1010a, the vehicles 1010b-1 and 1010b-2, the extended reality (XR) device 1010c, the hand-held device 1010d, the home appliance 1010e, the IoT (Internet of Thing) device 1010f through the network (300 in FIG. 11). The robot 1010a, vehicles 1010b-1 and 1010b-2, extended reality (XR) device 1010c, hand-held device 1010d, home appliance 1010e, and IoT (Internet of Thing) device 1010f to which the AI technology is applied may be referred to as AI devices.

Hereinafter, examples of AI devices will be described.

(The 1st AI Device Example—AI+Robot)

An AI technology is applied to the robot 1010a, and the robot 1010a may be implemented as a guidance robot, a transport robot, a cleaning robot, a wearable robot, an entertainment robot, a pet robot, an unmanned flight robot, etc. The robot 1010a may include a robot control module for controlling an operation. The robot control module may mean a software module or a chip in which a software module has been implemented using hardware. The robot 1010a may obtain state information of the robot 1010a, may detect (recognize) a surrounding environment and object, may generate map data, may determine a moving path and a running plan, may determine a response to a user interaction, or may determine an operation using sensor information obtained from various types of sensors. In this case, the robot 1010a may use sensor information obtained by at least one sensor among LIDAR, a radar, and a camera in order to determine the moving path and running plan.

The robot 1010a may perform the above operations using a learning model configured with at least one artificial neural network. For example, the robot 1010a may recognize a surrounding environment and object using a learning model, and may determine an operation using recognized surrounding environment information or object information. In this case, the learning model may have been directly trained in the robot 1010a or may have been trained in an external device, such as the AI server 400. In this case, the robot 1010a may directly generate results using the learning model and perform an operation, but may perform an operation by transmitting sensor information to an external device, such as the AI server 400, and receiving results generated in response thereto.

The robot 1010a may determine a moving path and running plan using at least one of map data, object information detected from sensor information, or object information obtained from an external device. The robot 1010a may run along the determined moving path and running plan by controlling the driving unit. The map data may include object identification information for various objects disposed in the space in which the robot 1010a moves. For example, the map data may include object identification information for fixed objects, such as a wall and a door, and movable objects, such as a flowport and a desk. Furthermore, the object identification information may include a name, a type, a distance, a location, etc.

The robot 1010a may perform an operation or run by controlling the driving unit based on a users control/interaction. In this case, the robot 1010a may obtain intention information of an interaction according to a users behavior or voice speaking, may determine a response based on the obtained intention information, and may perform an operation.

(The 2nd AI Device Example—AI+Self-Driving)

An AI technology is applied to the self-driving vehicle (1010b-1, 1010b-2), and the self-driving vehicle (1010b-1, 1010b-2) may be implemented as a movable type robot, a vehicle, an unmanned flight body, etc. The self-driving vehicle (1010b-1, 1010b-2) may include a self-driving control module for controlling a self-driving function. The self-driving control module may mean a software module or a chip in which a software module has been implemented using hardware. The self-driving control module may be included in the self-driving vehicle (1010b-1, 1010b-2) as an element of the self-driving vehicle 100b, but may be configured as separate hardware outside the self-driving vehicle 100b and connected to the self-driving vehicle (1010b-1, 1010b-2).

The self-driving vehicle (1010b-1, 1010b-2) may obtain state information of the self-driving vehicle (1010b-1, 1010b-2), may detect (recognize) a surrounding environment and object, may generate map data, may determine a moving path and running plan, or may determine an operation using sensor information obtained from various types of sensors. In this case, in order to determine the moving path and running plan, like the robot 1010a, the self-driving vehicle (1010b-1, 1010b-2) may use sensor information obtained from at least one sensor among LIDAR, a radar and a camera. Particularly, the self-driving vehicle (1010b-1, 1010b-2) may recognize an environment or object in an area whose view is blocked or an area of a given distance or more by receiving sensor information for the environment or object from external devices, or may directly receive recognized information for the environment or object from external devices.

The self-driving vehicle (1010b-1, 1010b-2) may perform the above operations using a learning model configured with at least one artificial neural network. For example, the self-driving vehicle (1010b-1, 1010b-2) may recognize a surrounding environment and object using a learning model, and may determine the flow of running using recognized surrounding environment information or object information. In this case, the learning model may have been directly trained in the self-driving vehicle (1010b-1, 1010b-2) or may have been trained in an external device, such as the AI server 400. In this case, the self-driving vehicle (1010b-1, 1010b-2) may directly generate results using the learning model and perform an operation, but may perform an operation by transmitting sensor information to an external device, such as the AI server 400, and receiving results generated in response thereto.

The self-driving vehicle (1010b-1, 1010b-2) may determine a moving path and running plan using at least one of map data, object information detected from sensor information or object information obtained from an external device. The self-driving vehicle (1010b-1, 1010b-2) may run based on the determined moving path and running plan by controlling the driving unit. The map data may include object identification information for various objects disposed in the space (e.g., road) in which the self-driving vehicle (1010b-1, 1010b-2) runs. For example, the map data may include object identification information for fixed objects, such as a streetlight, a rock, and a building, etc., and movable objects, such as a vehicle and a pedestrian. Furthermore, the object identification information may include a name, a type, a distance, a location, etc.

Furthermore, the self-driving vehicle (1010b-1, 1010b-2) may perform an operation or may run by controlling the driving unit based on a users control/interaction. In this case, the self-driving vehicle 100b may obtain intention information of an interaction according to a user behavior or voice speaking, may determine a response based on the obtained intention information, and may perform an operation.

(The 3rd AI Device Example—AI+XR)

An AI technology is applied to the XR device 1030c, and the XR device 1030c may be implemented as a head-mount display, a head-up display provided in a vehicle, television, a mobile phone, a smartphone, a computer, a wearable device, home appliances, a digital signage, a vehicle, a fixed type robot or a movable type robot. The XR device 1030c may generate location data and attributes data for three-dimensional points by analyzing three-dimensional point cloud data or image data obtained through various sensors or from an external device, may obtain information on a surrounding space or real object based on the generated location data and attributes data, and may output an XR object by rendering the XR object. For example, the XR device 1030c may output an XR object, including additional information for a recognized object, by making the XR object correspond to the corresponding recognized object.

The XR device 1030c may perform the above operations using a learning model configured with at least one artificial neural network. For example, the XR device 1030c may recognize a real object in three-dimensional point cloud data or image data using a learning model, and may provide information corresponding to the recognized real object. In this case, the learning model may have been directly trained in the XR device 1030c or may have been trained in an external device, such as the AI server 400. In this case, the XR device 1030c may directly generate results using a learning model and perform an operation, but may perform an operation by transmitting sensor information to an external device, such as the AI server 400, and receiving results generated in response thereto.

(The 4th AI Device Example—AI+Robot+Self-Driving Vehicle)

An AI technology and a self-driving technology are applied to the robot 1010a, and the robot 1010a may be implemented as a guidance robot, a transport robot, a cleaning robot, a wearable robot, an entertainment robot, a pet robot, an unmanned flight robot, etc. The robot 1010a to which the AI technology and the self-driving technology have been applied may mean a robot itself having a self-driving function or may mean the robot 1010a interacting with the self-driving vehicle (1010b-1, 1010b-2). The robot 1010a having the self-driving function may collectively refer to devices that autonomously move along a given flow without control of a user or autonomously determine a flow and move. The robot 1010a and the self-driving vehicle (1010b-1, 1010b-2) having the self-driving function may use a common sensing method in order to determine one or more of a moving path or a running plan. For example, the robot 1010a and the self-driving vehicle (1010b-1, 1010b-2) having the self-driving function may determine one or more of a moving path or a running plan using information sensed through LIDAR, a radar, a camera, etc.

The robot 1010a interacting with the self-driving vehicle (1010b-1, 1010b-2) is present separately from the self-driving vehicle (1010b-1, 1010b-2), and may perform an operation associated with a self-driving function inside or outside the self-driving vehicle (1010b-1, 1010b-2) or related to a user got in the self-driving vehicle (1010b-1, 1010b-2). In this case, the robot 1010a interacting with the self-driving vehicle (1010b-1, 1010b-2) may control or assist the self-driving function of the self-driving vehicle (1010b-1, 1010b-2) by obtaining sensor information in place of the self-driving vehicle (1010b-1, 1010b-2) and providing the sensor information to the self-driving vehicle (1010b-1, 1010b-2), or by obtaining sensor information, generating surrounding environment information or object information, and providing the surrounding environment information or object information to the self-driving vehicle (1010b-1, 1010b-2).

The robot 1010a interacting with the self-driving vehicle (1010b-1, 1010b-2) may control the function of the self-driving vehicle (1010b-1, 1010b-2) by monitoring a user got in the self-driving vehicle (1010b-1, 1010b-2) or through an interaction with a user. For example, if a driver is determined to be a drowsiness state, the robot 1010a may activate the self-driving function of the self-driving vehicle (1010b-1, 1010b-2) or assist control of the driving unit of the self-driving vehicle (1010b-1, 1010b-2). In this case, the function of the self-driving vehicle (1010b-1, 1010b-2) controlled by the robot 1010a may include a function provided by a navigation system or audio system provided within the self-driving vehicle (1010b-1, 1010b-2), in addition to a self-driving function simply.

The robot 1010a interacting with the self-driving vehicle (1010b-1, 1010b-2) may provide information to the self-driving vehicle (1010b-1, 1010b-2) or may assist a function outside the self-driving vehicle (1010b-1, 1010b-2). For example, the robot 100a may provide the self-driving vehicle (1010b-1, 1010b-2) with traffic information, including signal information, as in a smart traffic light, and may automatically connect an electric charger to a filling inlet through an interaction with the self-driving vehicle (1010b-1, 1010b-2) as in the automatic electric charger of an electric vehicle.

(The 5th AI Device Example—AI+Robot+XR)

An AI technology and an XR technology are applied to the robot 1010a, and the robot 1010a may be implemented as a guidance robot, a transport robot, a cleaning robot, a wearable robot, an entertainment robot, a pet robot, an unmanned flight robot, a drone, etc. The robot 1010a to which the XR technology has been applied may mean a robot, that is, a target of control/interaction within an XR image. In this case, the robot 1010a is different from the XR device 1010c, and they may operate in conjunction with each other.

When the robot 1010a, that is, a target of control/interaction within an XR image, obtains sensor information from sensors including a camera, the robot 1010a or the XR device 1010c may generate an XR image based on the sensor information, and the XR device 1010c may output the generated XR image. Furthermore, the robot 1010a may operate based on a control signal received through the XR device 1010c or a users interaction. For example, a user may identify a corresponding XR image at timing of the robot 1010a, remotely operating in conjunction through an external device, such as the XR device 1010c, may adjust the self-driving path of the robot 1010a through an interaction, may control an operation or driving, or may identify information of a surrounding object.

(The 6th AI Device Example—AI+Self-Driving Vehicle+XR)

An AI technology and an XR technology are applied to the self-driving vehicle (1010b-1, 1010b-2), and the self-driving vehicle (1010b-1, 1010b-2) may be implemented as a movable type robot, a vehicle, an unmanned flight body, etc. The self-driving vehicle (1010b-1, 1010b-2) to which the XR technology has been applied may mean a self-driving vehicle equipped with means for providing an XR image or a self-driving vehicle, that is, a target of control/interaction within an XR image. Particularly, the self-driving vehicle 100b, that is, a target of control/interaction within an XR image, is different from the XR device 1010c, and they may operate in conjunction with each other.

The self-driving vehicle (1010b-1, 1010b-2) equipped with the means for providing an XR image may obtain sensor information from sensors including a camera, and may output an XR image generated based on the obtained sensor information. For example, the self-driving vehicle (1010b-1, 1010b-2) includes an HUD, and may provide a passenger with an XR object corresponding to a real object or an object within a screen by outputting an XR image. In this case, when the XR object is output to the HUD, at least some of the XR object may be output with it overlapping a real object toward which a passenger's view is directed. In contrast, when the XR object is displayed on a display included within the self-driving vehicle (1010b-1, 1010b-2), at least some of the XR object may be output so that it overlaps an object within a screen. For example, the self-driving vehicle (1010b-1, 1010b-2) may output XR objects corresponding to objects, such as a carriageway, another vehicle, a traffic light, a signpost, a two-wheeled vehicle, a pedestrian, and a building.

When the self-driving vehicle (1010b-1, 1010b-2), that is, a target of control/interaction within an XR image, obtains sensor information from sensors including a camera, the self-driving vehicle (1010b-1, 1010b-2) or the XR device 1010c may generate an XR image based on the sensor information. The XR device 1010c may output the generated XR image. Furthermore, the self-driving vehicle (1010*b*-1, 1010*b*-2) may operate based on a control signal received through an external device, such as the XR device 1010*c*, or a user's interaction.

The embodiments described above are implemented by combinations of components and features of the present disclosure in predetermined forms. Each component or feature should be considered selectively unless specified separately. Each component or feature may be carried out without being combined with another component or feature. Moreover, some components and/or features are combined with each other and may implement embodiments of the present disclosure. The order of operations described in embodiments of the present disclosure may be changed. Some components or features of one embodiment may be included in another embodiment, or may be replaced by corresponding components or features of another embodiment. It is apparent that some claims referring to specific claims may be combined with another claims referring to the claims other than the specific claims to constitute the embodiment or add new claims by means of amendment after the application is filed.

Embodiments of the present disclosure may be implemented by various means, for example, hardware, firmware, software, or combinations thereof. When embodiments are implemented by hardware, one embodiment of the present disclosure may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and the like.

When embodiments are implemented by firmware or software, one embodiment of the present disclosure may be implemented by modules, procedures, functions, etc. Performing functions or operations described above. Software code may be stored in a memory and may be driven by a processor. The memory is provided inside or outside the processor and may exchange data with the processor by various well-known means.

It is apparent to those skilled in the art that the present disclosure may be embodied in other specific forms without departing from essential features of the present disclosure. Accordingly, the aforementioned detailed description should not be construed as limiting in all aspects and should be considered as illustrative. The scope of the present disclosure should be determined by rational construing of the appended claims, and all modifications within an equivalent scope of the present disclosure are included in the scope of the present disclosure.

INDUSTRIAL APPLICABILITY

An example in which the method of transmitting and receiving data in a wireless communication system of the present disclosure has been illustrated as being applied to the 3GPP LTE/LTE-A system and 5G system (new RAT system), but the method may be applied to various wireless communication systems in addition thereto.

The invention claimed is:

1. A method performed by a terminal in a wireless communication system, the method comprising:
   receiving bandwidth part (BWP) configuration information for configuring one or more BWPs;
   receiving information for activating a specific BWP among the one or more BWPs;
   receiving configuration information related to a control resource set (CORESET) based on the activated specific BWP,
   wherein a first CORESET and a second CORESET are configured based on the configuration information,
   wherein the first CORESET and the second CORESET are related to different CORESET pool indexes;
   receiving physical downlink shared channel (PDSCH) configuration information that includes a first scrambling identifier and a second scrambling identifier;
   receiving a first physical downlink control channel (PDCCH) based on the first CORESET;
   receiving a second PDCCH based on the second CORESET;
   receiving a first PDSCH scheduled by the first PDCCH; and
   receiving a second PDSCH scheduled by the second PDCCH,
   wherein a scrambling sequence generator related to each PDSCH is initialized based on $n_{ID}$,
   wherein, based on a codeword related to the first PDSCH being scheduled based on the first CORESET with a first CORESET pool index, the $n_{ID}$ equals the first scrambling identifier, and
   wherein, based on a codeword related to the second PDSCH being scheduled based on the second CORESET with a second CORESET pool index, the $n_{ID}$ equals the second scrambling identifier.

2. The method of claim 1, further comprising:
   descrambling the first PDSCH and the second PDSCH based on the first scrambling identifier and the second scrambling identifier.

3. The method of claim 2, wherein spatial related information for receiving the first PDCCH and the second PDCCH is configured for each CORESET.

4. The method of claim 3, wherein the spatial related information includes at least one of a quasi co-location (QCL) application related parameter, QCL type information, or QCL related reference signal information.

5. A terminal configured to operate in a wireless communication system, the terminal comprising:
   one or more transceivers;
   one or more processors; and
   one or more memories configured to store instructions that, when executed, cause the one or more processors to perform operations comprising:
   receiving bandwidth part (BWP) configuration information for configuring one or more BWPs;
   receiving information for activating a specific BWP among the one or more BWPs;
   receiving configuration information related to a control resource set (CORESET) based on the activated specific BWP,
   wherein a first CORESET and a second CORESET are configured based on the configuration information,
   wherein the first CORESET and the second CORESET are related to different CORESET pool indexes;
   receiving physical downlink shared channel (PDSCH) configuration information that includes a first scrambling identifier and a second scrambling identifier;
   receiving a first physical downlink control channel (PDCCH) based on the first CORESET;
   receiving a second PDCCH based on the second CORESET;
   receiving a first PDSCH scheduled by the first PDCCH; and receiving a second PDSCH scheduled by the second PDCCH, wherein a scrambling sequence generator related to each PDSCH is initialized based on $n_{ID}$, wherein, based on a codeword related to the first PDSCH being scheduled based on the first CORESET with a first CORESET pool index, the $n_{ID}$ equals the first scrambling identifier, and wherein, based on a codeword related to the second PDSCH being scheduled based on the second CORESET with a second CORESET pool index, the $n_{ID}$ equals the second scrambling identifier.

6. The terminal of claim 5, wherein the operations further include:

descrambling the first PDSCH and the second PDSCH based on the first scrambling identifier and the second scrambling identifier.

7. A base station configured to operate in a wireless communication system, the base station comprising:

one or more transceivers;

one or more processors; and one or more memories configured to store instructions that, when executed, cause the one or more processors to perform operations comprising:

transmitting bandwidth part (BWP) configuration information for configuring one or more BWPs;

transmitting information for activating a specific BWP among the one or more BWPs;

transmitting configuration information related to a control resource set (CORESET) based on the activated specific BWP, wherein a first CORESET and a second CORESET are configured based on the configuration information, wherein the first CORESET and the second CORESET are related to different CORESET pool indexes;

transmitting physical downlink shared channel (PDSCH) configuration information that includes a first scrambling identifier and a second scrambling identifier;

transmitting a first physical downlink control channel (PDCCH) based on the first CORESET;

transmitting a second PDCCH based on the second CORESET;

transmitting a first PDSCH scheduled by the first PDCCH; and transmitting a second PDSCH scheduled by the second PDCCH, wherein a scrambling sequence generator related to each PDSCH is initialized based on $n_{ID}$, wherein, based on a codeword related to the first PDSCH being scheduled based on the first CORESET with a first CORESET pool index, the nip equals the first scrambling identifier, and wherein, based on a codeword related to the second PDSCH being scheduled based on the second CORESET with a second CORESET pool index, the $n_{ID}$ equals the second scrambling identifier.

* * * * *